(12) United States Patent
Van De Groenendaal et al.

(10) Patent No.: US 10,687,127 B2
(45) Date of Patent: Jun. 16, 2020

(54) TECHNOLOGIES FOR MANAGING THE EFFICIENCY OF WORKLOAD EXECUTION

(71) Applicant: Intel Corporation, Santa Clara, CA (US)

(72) Inventors: Johan G. Van De Groenendaal, Portland, OR (US); Mrittika Ganguli, Bangalore (IN); Ahmad Yasin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 15/395,174

(22) Filed: Dec. 30, 2016

(65) Prior Publication Data

US 2018/0027066 A1 Jan. 25, 2018

Related U.S. Application Data

(60) Provisional application No. 62/427,268, filed on Nov. 29, 2016, provisional application No. 62/376,859, (Continued)

(51) Int. Cl.
*H04L 29/08* (2006.01)
*H04L 12/24* (2006.01)
(Continued)

(52) U.S. Cl.
CPC ...... *H04Q 11/0005* (2013.01); *B25J 15/0014* (2013.01); *B65G 1/0492* (2013.01); *G02B 6/3882* (2013.01); *G02B 6/3893* (2013.01); *G02B 6/3897* (2013.01); *G02B 6/4292* (2013.01); *G02B 6/4452* (2013.01); *G05D 23/1921* (2013.01); *G05D 23/2039* (2013.01); *G06F 1/183* (2013.01); *G06F 1/20* (2013.01); *G06F 3/061* (2013.01); *G06F 3/064* (2013.01);
(Continued)

(58) Field of Classification Search
USPC ......................................................... 709/206
See application file for complete search history.

(56) References Cited

U.S. PATENT DOCUMENTS 7,254,448 B2 * 8/2007 Almendinger ....... A61B 5/0031
128/903
8,892,531 B2 * 11/2014 Kaplan ................... G06F 16/11
707/694
(Continued)

OTHER PUBLICATIONS

International search report for PCT application No. PCT/US2017/038753, dated Sep. 29, 2017 (3 pages).
(Continued)

*Primary Examiner* — Jude Jean Gilles
(74) *Attorney, Agent, or Firm* — Barnes & Thornburg LLP

(57) ABSTRACT

Technologies for managing the efficiency of workload execution in a managed node include a managed node that includes one or more processors that each include multiple cores. The managed nodes is to execute threads of workloads assigned to the managed node, generate telemetry data indicative of an efficiency of execution of the threads, determine, as a function of the telemetry data, an adjustment to a configuration of the threads among the cores to increase the efficiency of the execution of the threads, and apply the determined adjustment. Other embodiments are also described and claimed.

28 Claims, 19 Drawing Sheets

Data Center *100*

Related U.S. Application Data filed on Aug. 18, 2016, provisional application No. 62/365,969, filed on Jul. 22, 2016.

(51) Int. Cl.

| | |
|---|---|
| H04L 12/26 | (2006.01) |
| H04Q 11/00 | (2006.01) |
| H03M 7/30 | (2006.01) |
| H03M 7/40 | (2006.01) |
| G06F 16/901 | (2019.01) |
| G06F 3/06 | (2006.01) |
| H04L 12/811 | (2013.01) |
| G06F 1/20 | (2006.01) |
| G11C 7/10 | (2006.01) |
| H05K 7/14 | (2006.01) |
| G06F 1/18 | (2006.01) |
| G06F 13/40 | (2006.01) |
| H05K 5/02 | (2006.01) |
| G08C 17/02 | (2006.01) |
| H04L 12/851 | (2013.01) |
| G06F 9/50 | (2006.01) |
| H04L 12/911 | (2013.01) |
| G06F 12/109 | (2016.01) |
| H04L 29/06 | (2006.01) |
| G11C 14/00 | (2006.01) |
| G11C 5/02 | (2006.01) |
| G11C 11/56 | (2006.01) |
| G02B 6/44 | (2006.01) |
| G06F 8/65 | (2018.01) |
| G06F 12/14 | (2006.01) |
| G06F 13/16 | (2006.01) |
| H04B 10/25 | (2013.01) |
| G06F 9/4401 | (2018.01) |
| G02B 6/38 | (2006.01) |
| G02B 6/42 | (2006.01) |
| B25J 15/00 | (2006.01) |
| B65G 1/04 | (2006.01) |
| H05K 7/20 | (2006.01) |
| H04L 12/931 | (2013.01) |
| H04L 12/939 | (2013.01) |
| H04W 4/02 | (2018.01) |
| H04L 12/751 | (2013.01) |
| G06F 13/42 | (2006.01) |
| H05K 1/18 | (2006.01) |
| G05D 23/19 | (2006.01) |
| G05D 23/20 | (2006.01) |
| H04L 12/927 | (2013.01) |
| H05K 1/02 | (2006.01) |
| H04L 12/781 | (2013.01) |
| H04Q 1/04 | (2006.01) |
| G06F 12/0893 | (2016.01) |
| H05K 13/04 | (2006.01) |
| G11C 5/06 | (2006.01) |
| G06F 11/14 | (2006.01) |
| G06F 11/34 | (2006.01) |
| G06F 12/0862 | (2016.01) |
| G06F 15/80 | (2006.01) |
| H04L 12/919 | (2013.01) |
| G06F 12/10 | (2016.01) |
| G06Q 10/06 | (2012.01) |
| G07C 5/00 | (2006.01) |
| H04L 12/28 | (2006.01) |
| H04L 29/12 | (2006.01) |
| H04L 9/06 | (2006.01) |
| H04L 9/14 | (2006.01) |
| H04L 9/32 | (2006.01) |
| H04L 12/933 | (2013.01) |
| H04L 12/947 | (2013.01) |
| G06F 9/30 | (2018.01) |
| G06F 9/38 | (2018.01) |
| G06F 9/54 | (2006.01) |
| H04L 12/10 | (2006.01) |
| H04W 4/80 | (2018.01) |
| G06Q 10/08 | (2012.01) |
| G06Q 10/00 | (2012.01) |
| G06Q 50/04 | (2012.01) |

(52) U.S. Cl.
CPC ............ *G06F 3/067* (2013.01); *G06F 3/0611* (2013.01); *G06F 3/0613* (2013.01); *G06F 3/0616* (2013.01); *G06F 3/0619* (2013.01); *G06F 3/0625* (2013.01); *G06F 3/0631* (2013.01); *G06F 3/0638* (2013.01); *G06F 3/0647* (2013.01); *G06F 3/0653* (2013.01); *G06F 3/0655* (2013.01); *G06F 3/0658* (2013.01); *G06F 3/0659* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/3887* (2013.01); *G06F 9/4401* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 9/544* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 12/109* (2013.01); *G06F 12/1408* (2013.01); *G06F 13/161* (2013.01); *G06F 13/1668* (2013.01); *G06F 13/1694* (2013.01); *G06F 13/409* (2013.01); *G06F 13/4022* (2013.01); *G06F 13/4068* (2013.01); *G06F 13/42* (2013.01); *G06F 13/4282* (2013.01); *G06F 15/8061* (2013.01); *G06F 16/9014* (2019.01); *G06Q 10/06* (2013.01); *G06Q 10/06314* (2013.01); *G07C 5/008* (2013.01); *G08C 17/02* (2013.01); *G11C 5/02* (2013.01); *G11C 5/06* (2013.01); *G11C 7/1072* (2013.01); *G11C 11/56* (2013.01); *G11C 14/0009* (2013.01); *H03M 7/30* (2013.01); *H03M 7/3084* (2013.01); *H03M 7/3086* (2013.01); *H03M 7/40* (2013.01); *H03M 7/4031* (2013.01); *H03M 7/4056* (2013.01); *H03M 7/4081* (2013.01); *H03M 7/6005* (2013.01); *H03M 7/6023* (2013.01); *H04B 10/2504* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009* (2013.01); *H04L 41/024* (2013.01); *H04L 41/046* (2013.01); *H04L 41/082* (2013.01); *H04L 41/0813* (2013.01); *H04L 41/0896* (2013.01); *H04L 41/145* (2013.01); *H04L 41/147* (2013.01); *H04L 43/08* (2013.01); *H04L 43/0817* (2013.01); *H04L 43/0876* (2013.01); *H04L 43/0894* (2013.01); *H04L 43/16* (2013.01); *H04L 45/02* (2013.01); *H04L 45/52* (2013.01); *H04L 47/24* (2013.01); *H04L 47/38* (2013.01); *H04L 47/765* (2013.01); *H04L 47/782* (2013.01);

*H04L 47/805* (2013.01); *H04L 47/82* (2013.01); *H04L 47/823* (2013.01); *H04L 49/00* (2013.01); *H04L 49/15* (2013.01); *H04L 49/25* (2013.01); *H04L 49/357* (2013.01); *H04L 49/45* (2013.01); *H04L 49/555* (2013.01); *H04L 67/02* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/306* (2013.01); *H04L 67/34* (2013.01); *H04L 69/04* (2013.01); *H04L 69/329* (2013.01); *H04Q 1/04* (2013.01); *H04Q 11/00* (2013.01); *H04Q 11/0003* (2013.01); *H04Q 11/0062* (2013.01); *H04Q 11/0071* (2013.01); *H04W 4/023* (2013.01); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1442* (2013.01); *H05K 7/1447* (2013.01); *H05K 7/1461* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/087* (2013.01); *G06Q 10/20* (2013.01); *G06Q 50/04* (2013.01); *G08C 2200/00* (2013.01); *H04B 10/25* (2013.01); *H04L 41/12* (2013.01); *H04L 41/5019* (2013.01); *H04L 43/065* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/80* (2018.02); *H05K 7/1485* (2013.01); *H05K 2201/066* (2013.01); *H05K 2201/10121* (2013.01); *H05K 2201/10159* (2013.01); *H05K 2201/10189* (2013.01); *Y02D 10/14* (2018.01); *Y02D 10/151* (2018.01); *Y02P 90/30* (2015.11); *Y04S 10/54* (2013.01); *Y10S 901/01* (2013.01)

(56) References Cited

U.S. PATENT DOCUMENTS

| | | | |
|---|---|---|---|
| 2004/0057544 A1* | 3/2004 | Fernald | H03K 3/0231 375/362 |
| 2008/0079714 A1* | 4/2008 | Shearer | G06T 15/50 345/419 |
| 2008/0079715 A1* | 4/2008 | Shearer | G06T 15/06 345/419 |
| 2008/0079734 A1* | 4/2008 | Shearer | G06T 15/06 345/505 |
| 2008/0271043 A1* | 10/2008 | Kim | G06F 11/3423 718/108 |
| 2008/0285462 A1* | 11/2008 | Baker | H04W 16/18 370/241 |
| 2009/0172362 A1 | 7/2009 | Shen et al. | |
| 2010/0058346 A1* | 3/2010 | Narang | G06F 9/5066 718/102 |
| 2010/0287561 A1* | 11/2010 | Floyd | G06F 11/3409 718/108 |
| 2011/0067029 A1 | 3/2011 | Wolfe et al. | |
| 2012/0079500 A1 | 3/2012 | Floyd et al. | |
| 2013/0145135 A1 | 6/2013 | Bell, Jr. et al. | |
| 2015/0331719 A1 | 11/2015 | Seo et al. | |
| 2017/0039161 A1* | 2/2017 | Gauthier, Jr. | G06F 13/4282 |

OTHER PUBLICATIONS

Written opinion for PCT application No. PCT/US2017/038753, dated Sep. 29, 2017 (7 pages).

\* cited by examiner

TECHNOLOGIES FOR MANAGING THE EFFICIENCY OF WORKLOAD EXECUTION

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

In a typical cloud-based computing environment (e.g., a data center), multiple compute nodes may execute workloads (e.g., applications, services, etc.) on behalf of customers. A human administrator may attempt to determine the efficiency of a compute node by estimating how long it takes for the compute node to complete a particular workload. Similarly, the administrator may form an estimate of the efficiency of the data center through great effort in tracking the amount of time to complete workloads across all of the compute nodes. However, the administrator does not have insight into the efficiency of the components within each compute node and is typically unable to adjust a configuration of the components within a managed node to increase the efficiency within a compute node. As such, to increase the performance of the data center, the administrator typically installs more hardware (e.g., more compute nodes), which leads to added cost and increased energy consumption.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
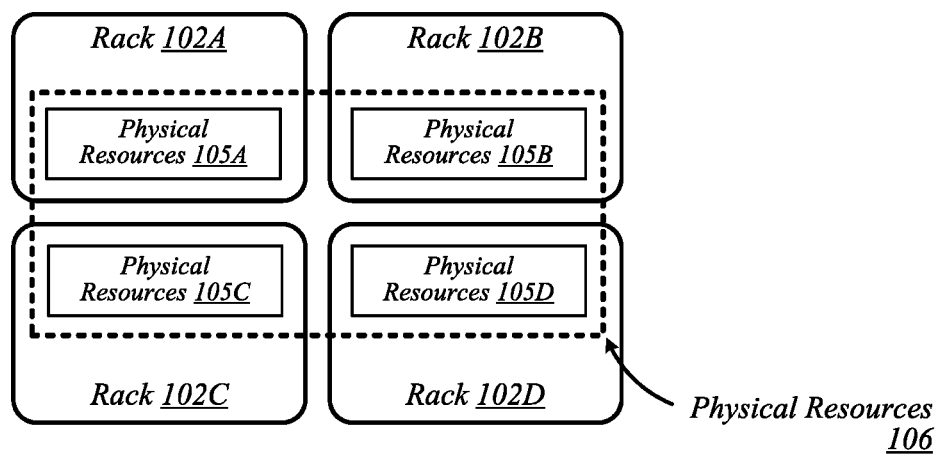
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
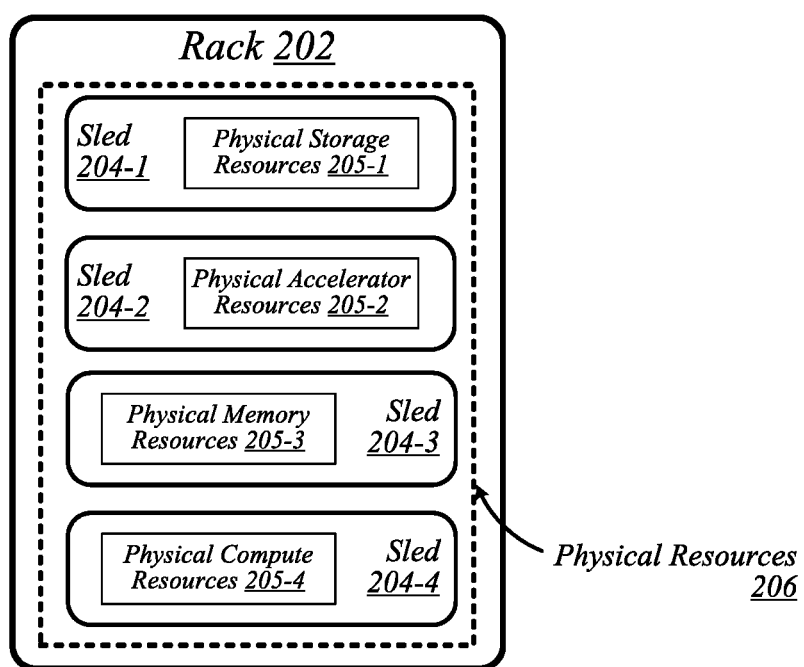
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
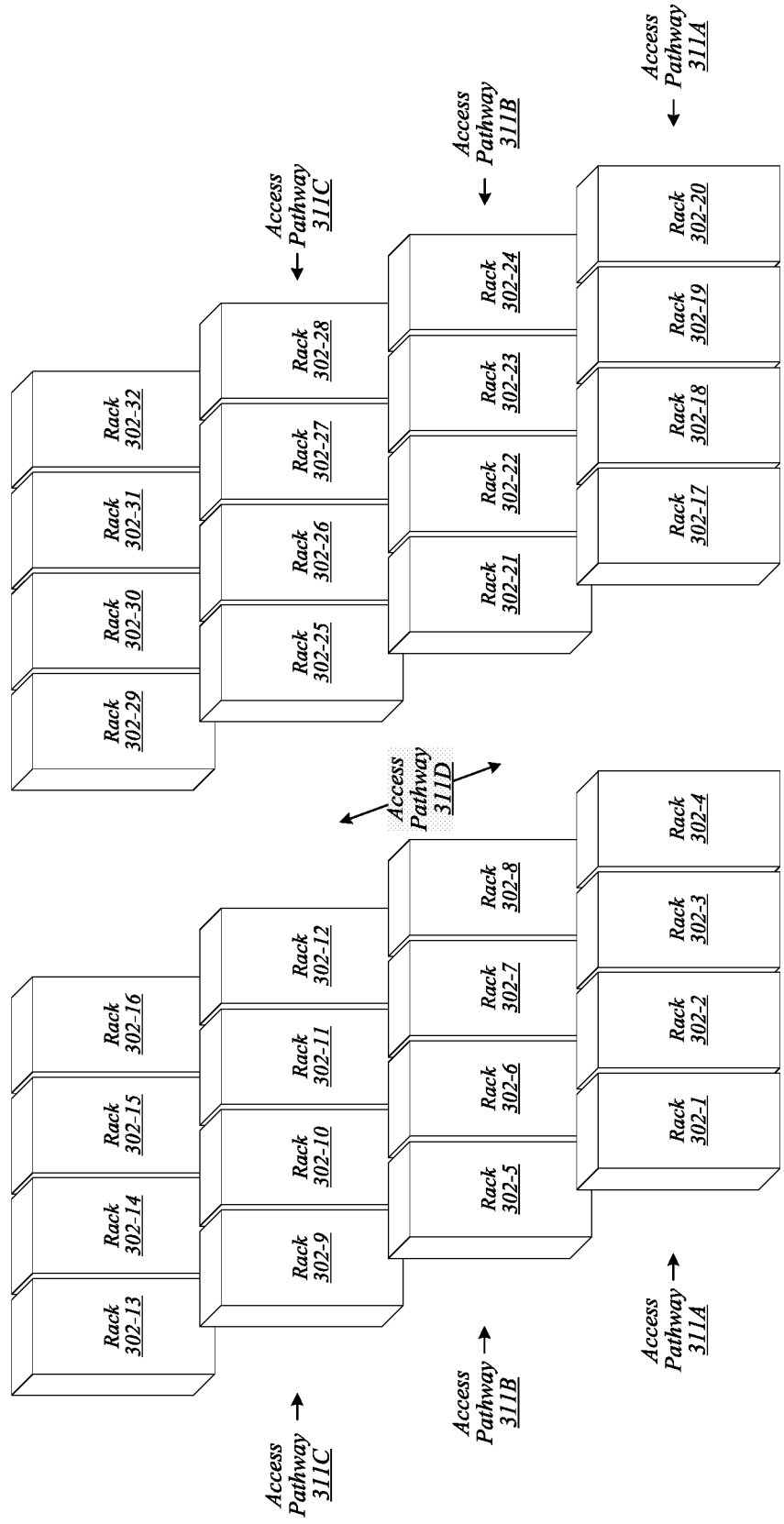
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
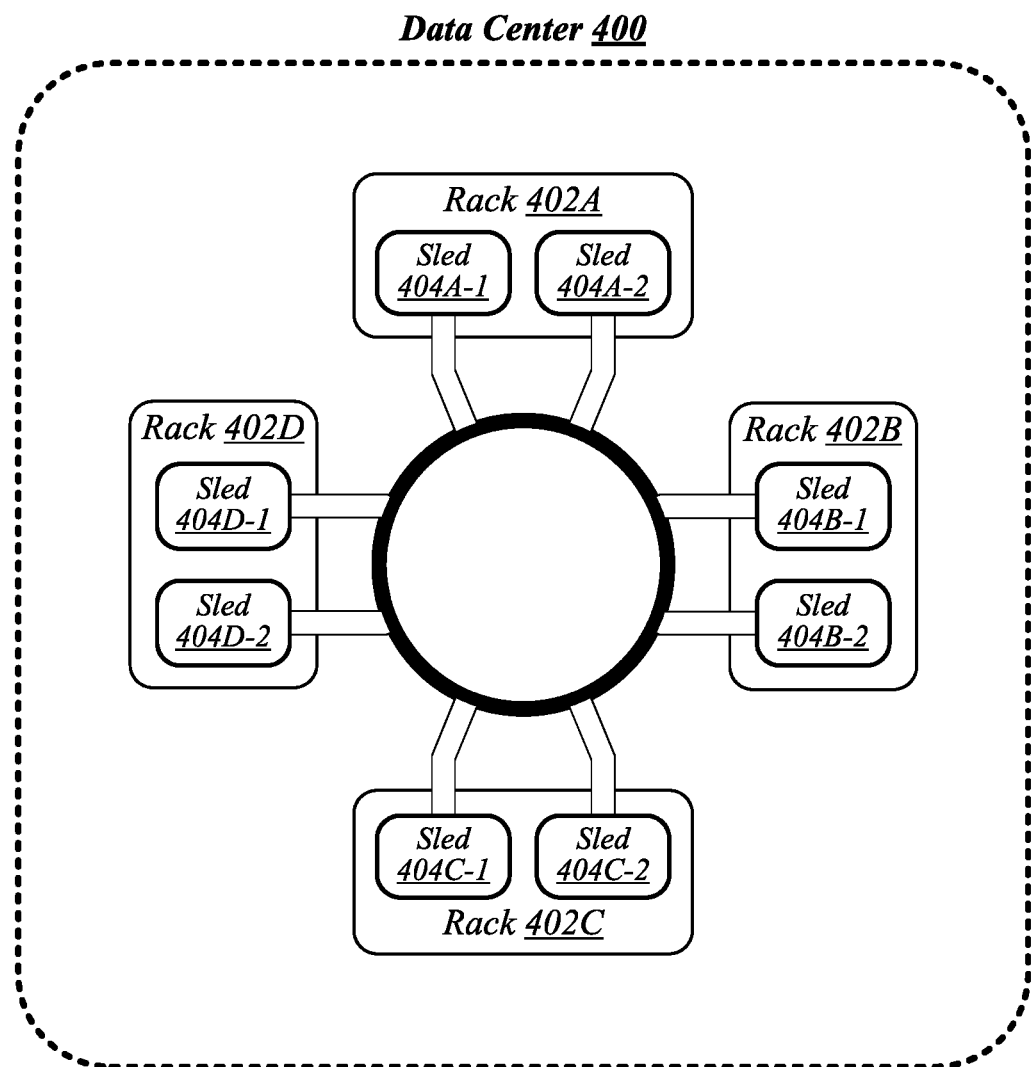
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
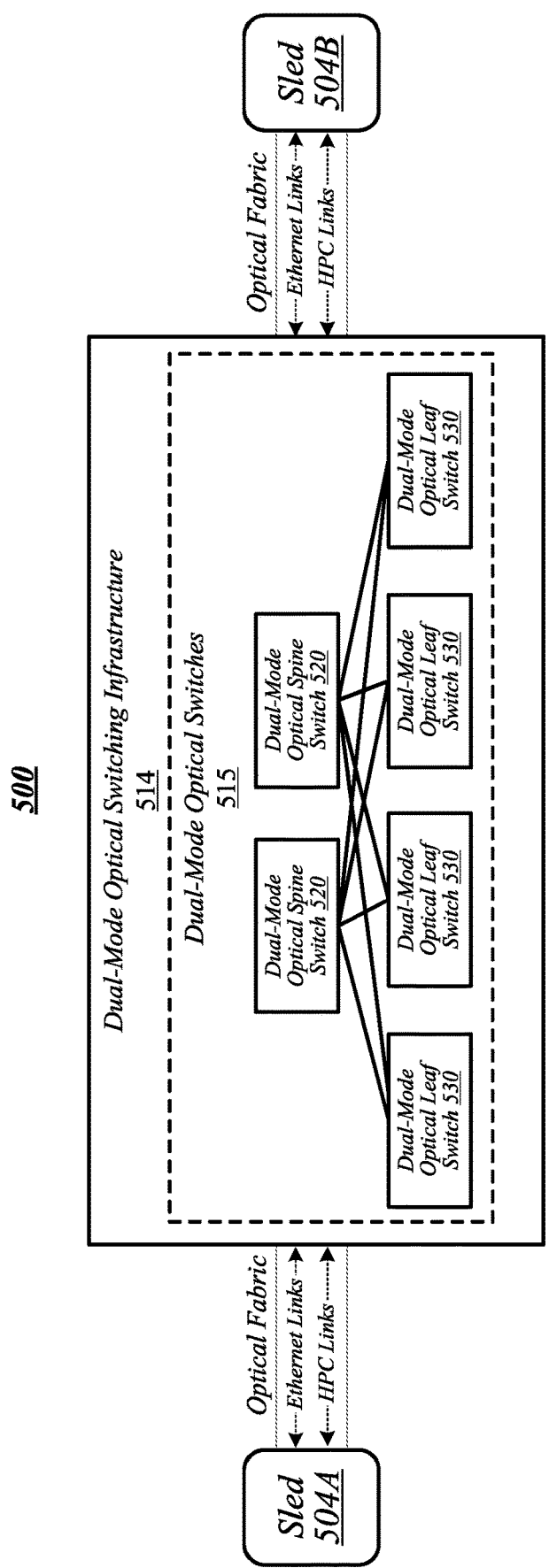
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
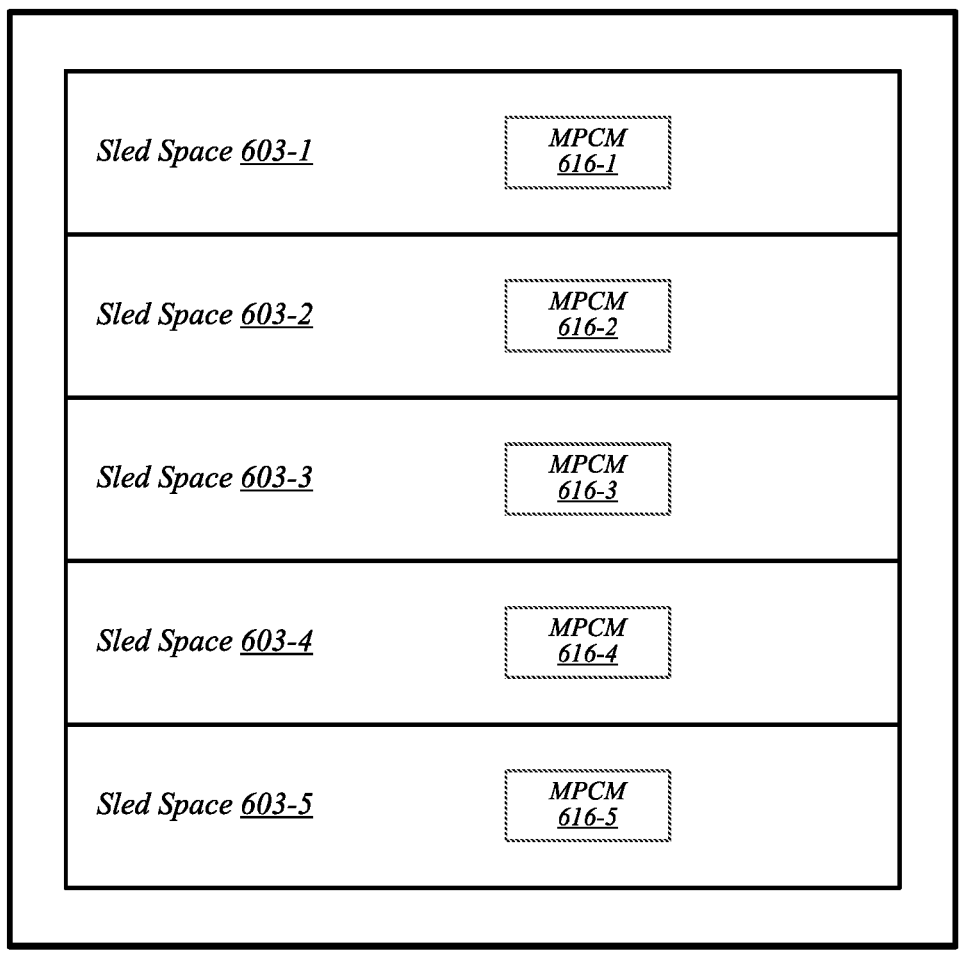
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
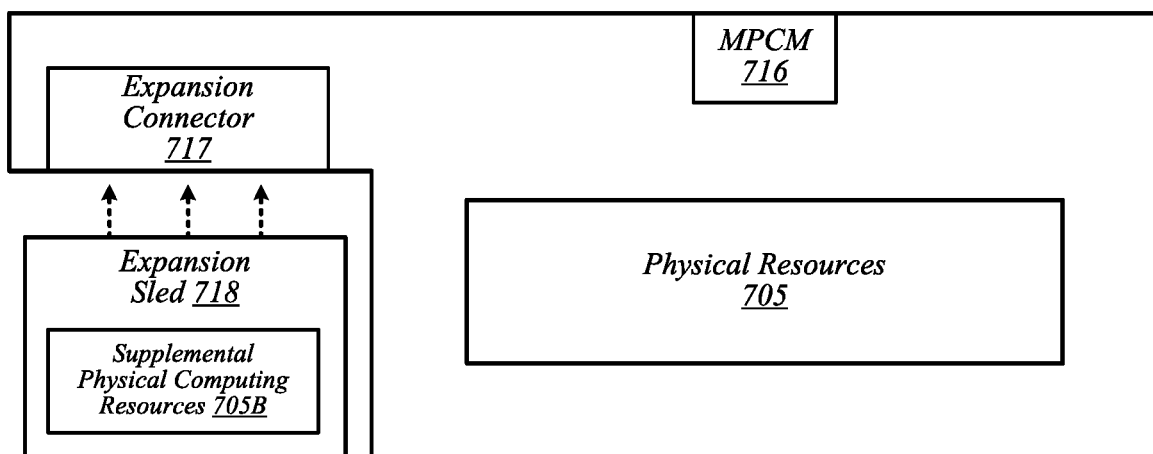
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
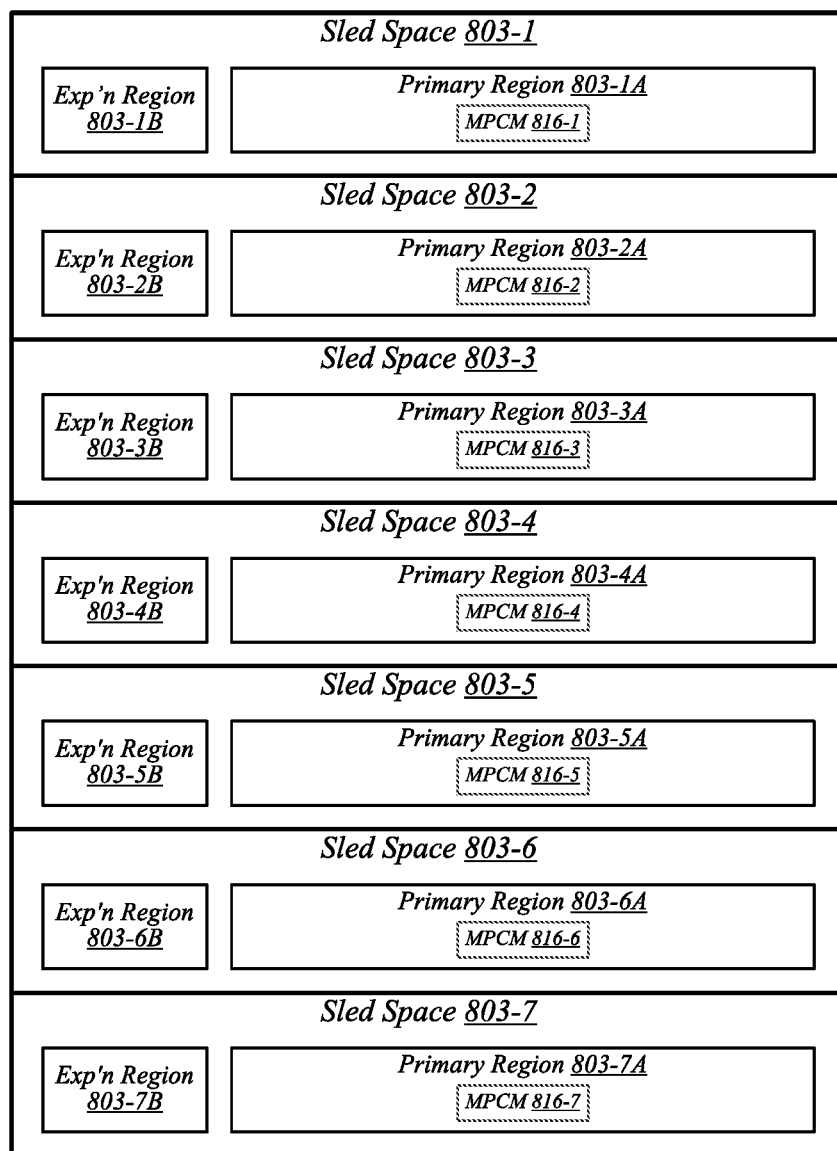
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
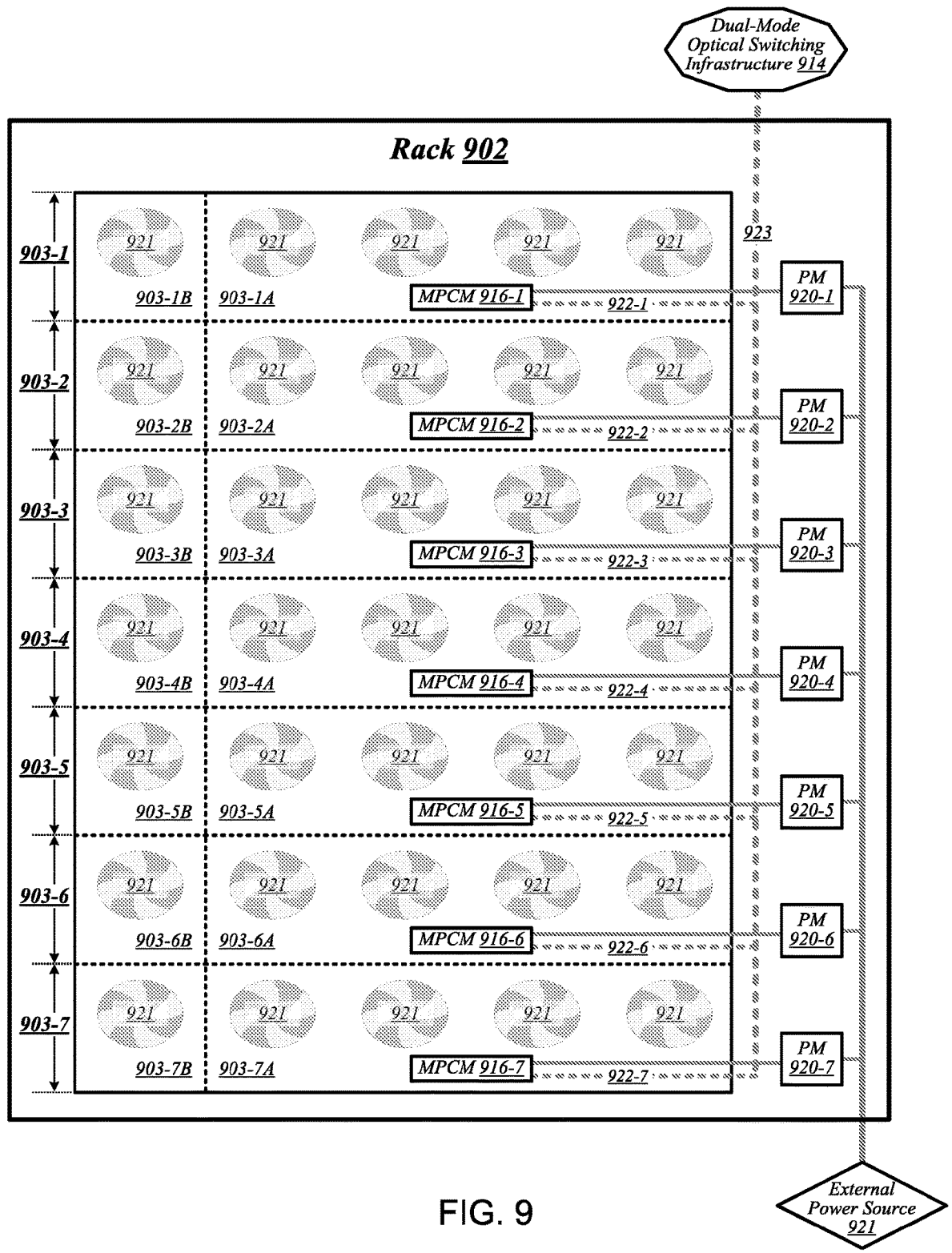
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
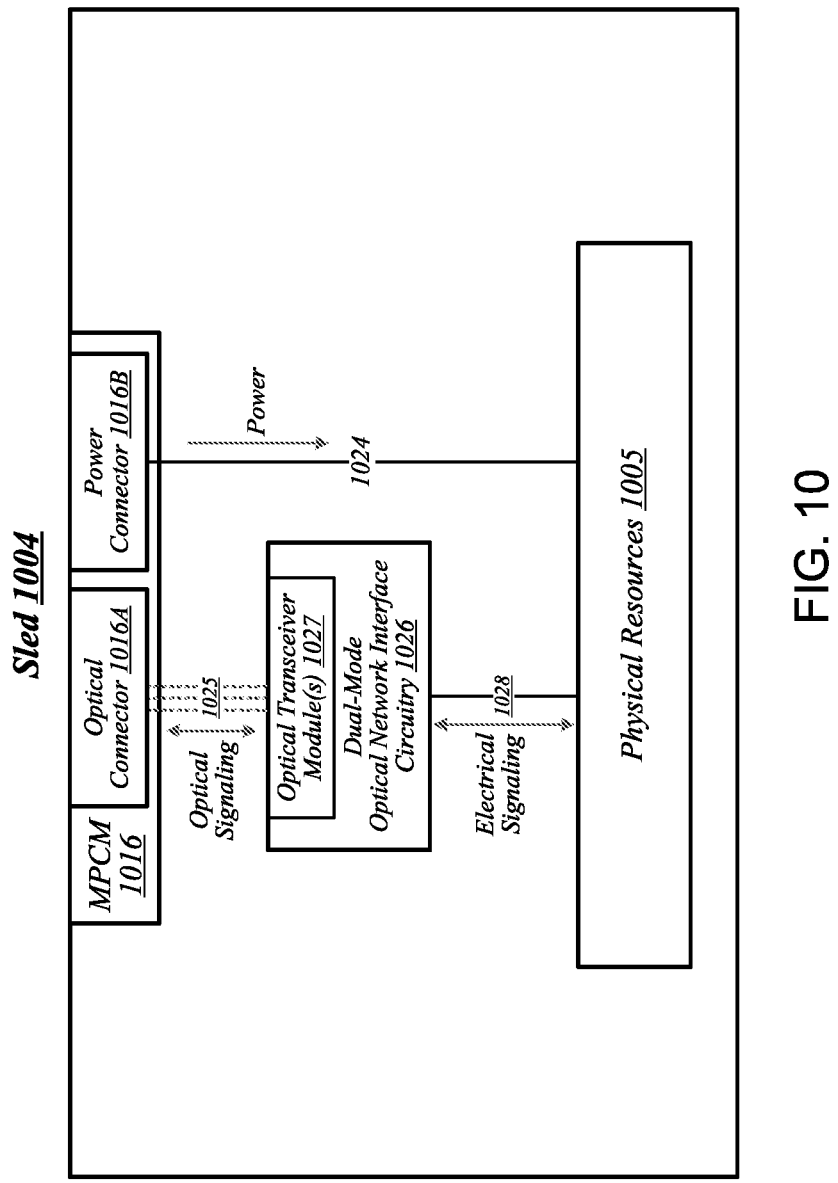
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
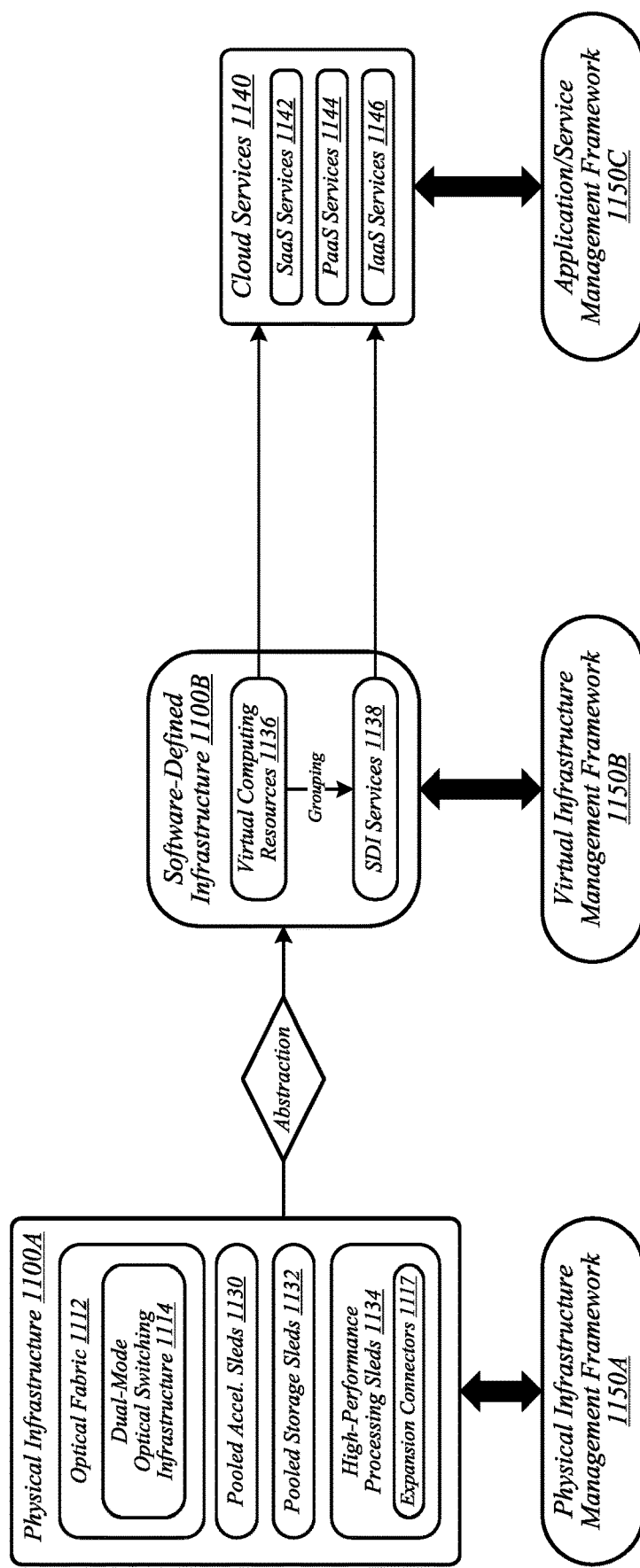
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
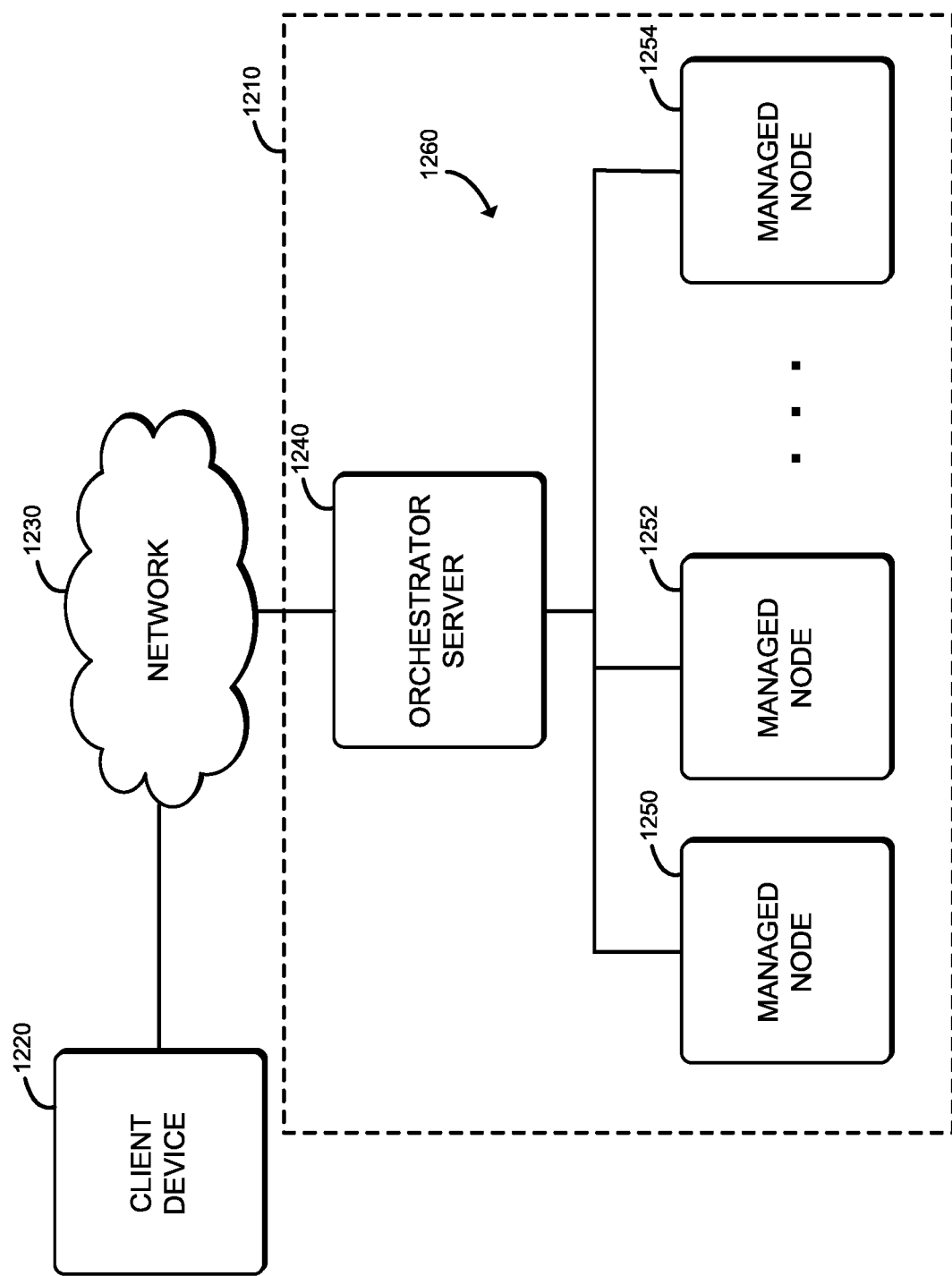
FIG. 12 is a simplified block diagram of at least one embodiment of a system for managing the efficiency of workload execution in a set of managed nodes.

As shown in FIG. 12, an illustrative system 1210 for managing the efficiency of execution of workloads with managed nodes 1260 includes an orchestrator server 1240 in communication with the set of managed nodes 1260. Each managed node 1260 may be embodied as an assembly of resources (e.g., physical resources 206), such as compute resources (e.g., physical compute resources 205-4), storage resources (e.g., physical storage resources 205-1), accelerator resources (e.g., physical accelerator resources 205-2), or other resources (e.g., physical memory resources 205-3) from the same or different sleds (e.g., the sleds 204-1, 204-2, 204-3, 204-4, etc.) or racks (e.g., one or more of racks 302-1 through 302-32). Each managed node 1260 may be established, defined, or "spun up" by the orchestrator server 1240 at the time a workload is to be assigned to the managed node 1260 or at any other time, and may exist regardless of whether any workloads are presently assigned to the managed node 1260. The system 1210 may be implemented in accordance with the data centers 100, 300, 400, 1100 described above with reference to FIGS. 1, 3, 4, and 11. In the illustrative embodiment, the set of managed nodes 1260 includes managed nodes 1250, 1252, and 1254. While three managed nodes 1260 are shown in the set, it should be understood that in other embodiments, the set may include a different number of managed nodes 1260 (e.g., tens of thousands). The system 1210 may be located in a data center and provide storage and compute services (e.g., cloud services) to a client device 1220 that is in communication with the system 1210 through a network 1230. The orchestrator server 1240 may support a cloud operating environment, such as OpenStack, and the managed nodes 1260 may execute one or more applications or processes (i.e., workloads), such as in virtual machines or containers, on behalf of a user of the client device 1220. As discussed in more detail herein, the orchestrator server 1240, in operation, is configured to assign workloads to the managed nodes 1260, and receive efficiency data produced by each managed node 1260 indicative of the efficiency of components, such as individual cores of one or more processors, in each managed node in executing the assigned workloads. The orchestrator server 1260 may analyze the efficiency data and determine adjustments to improve the efficiency of the components, such as by relocating threads of workloads to different cores, processors, or managed nodes 1260 and/or adjusting priorities of threads to that are bound by (e.g., spend a majority of their time in) particular pipeline stages of each core, to reduce stalling (e.g., when the number of cycles per instruction is below a threshold) of the cores.

In operation, each managed node 1260, in the illustrative embodiment, is configured to execute the assigned workloads, produce telemetry data indicative of the efficiency of the execution of the workloads within the managed node 1260, such as by utilizing a counter in each stage of a pipeline of each core to track the utilization of each pipeline stage by each thread, identifying patterns (e.g., fingerprints) in the usage of the stages by each thread over a predefined time period such as a second, determining, based on the telemetry data, adjustments such as relocation of threads to other cores or processors and/or adjustments to priorities of the threads, to improve the efficiency, and applying the adjustments. As such, the managed nodes 1260 may determine one or more of the adjustments themselves based on their local view of efficiency within the managed node 1260 and/or obtain adjustments from the orchestrator server 1240 based on a data-center-wide view of efficiency data from all of the managed nodes 1260. In the illustrative embodiment, increasing the efficiency of execution of a workload may be defined as decreasing the number of cycles per instruction executed by a core of the corresponding processor of the managed nodes 1260. Conversely, decreasing the efficiency of execution of a workload may be defined as increasing the number of cycles per instruction executed by a core of the corresponding processor of the managed nodes 1260.

Figure 13:
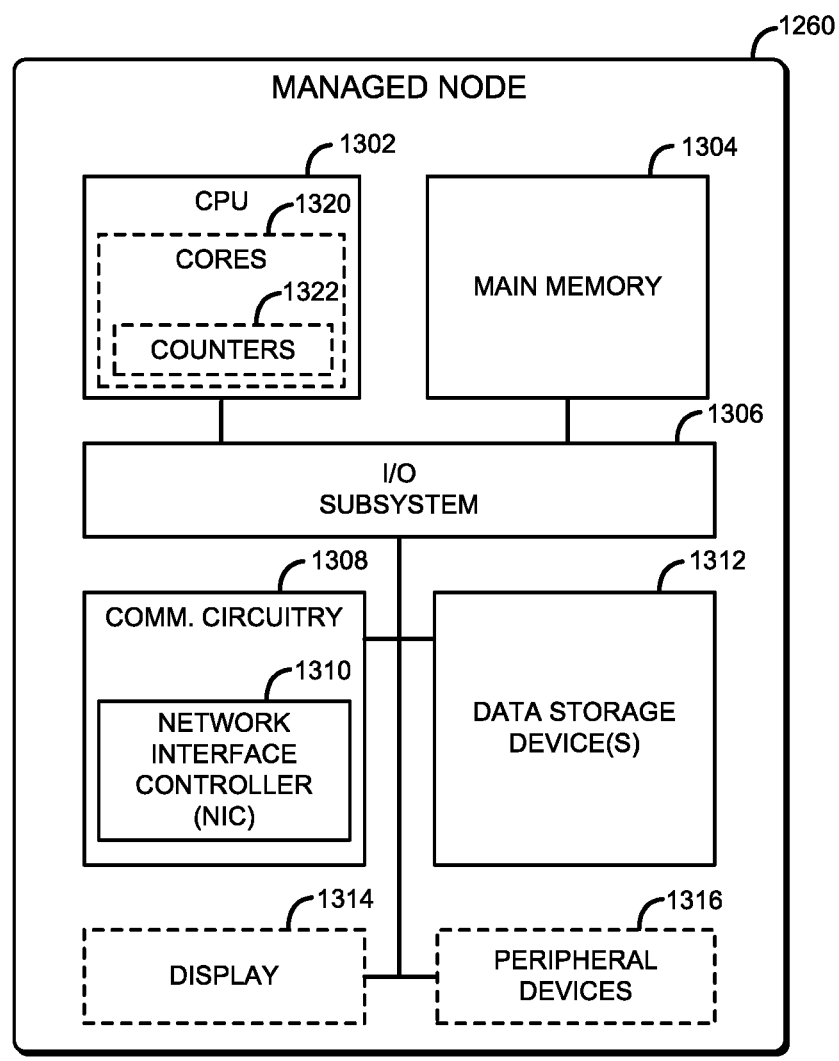
FIG. 13 is a simplified block diagram of at least one embodiment of a managed node of the system of FIG. 12.

Referring now to FIG. 13, each managed node 1260 may be embodied as any type of compute device capable of performing the functions described herein, including receiving assignments of workloads, executing the workloads, producing telemetry data as the workloads are executing, analyzing an efficiency of the execution of the workloads within the managed node 1260 using the telemetry data, providing efficiency data indicative of the efficiency of the execution to the orchestrator server 1240, determining configuration adjustments to increase the efficiency of the execution of the workloads within the managed node 1260, and applying the adjustments. For example, the managed node 1260 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance. As shown in FIG. 13, the illustrative managed node 1260 includes a central processing unit (CPU) 1302, a main memory 1304, an input/output (I/O) subsystem 1306, communication circuitry 1308, and one or more data storage devices 1312. Of course, in other embodiments, the managed node 1260 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 1304, or portions thereof, may be incorporated in the CPU 1302.

The CPU 1302 may be embodied as any type of processor or processors capable of performing the functions described herein. The CPU 1302 may be embodied as a single or multi-core processor(s), a microcontroller, or other processor or processing/controlling circuit. In some embodiments, the CPU 1302 may be embodied as, include, or be coupled to a field programmable gate array (FPGA), an application specific integrated circuit (ASIC), reconfigurable hardware or hardware circuitry, or other specialized hardware to facilitate performance of the functions described herein. In the illustrative embodiment, the CPU 1302 includes multiple cores 1320 which may be embodied as dedicated circuitry and/or components that process the instructions of threads of workloads in a pipeline that includes various stages, such as a frontend stage in which the instructions are fetched and decoded into operations to be performed, a backend stage in which threads await a data to be returned from memory or for a complex calculation to be completed, a bad speculation stage in which branches are cancelled due to misprediction, and a retiring stage in which threads are retired. In the illustrative embodiment, each core 1320 includes a set of counters 1322, with one counter 1322 for each pipeline stage. Each counter 1322 may be embodied as any device to generate a signal when an instruction of a thread is processed in the corresponding stage. As such, by tracking the number of cycles of the core 1320 (e.g., based on the frequency of the core) within a given time period (e.g., a second) and the number of instructions processed, as indicated by the counters 1322, the CPU 1302 may determine a number of instructions per cycle per core, and what stages each thread spends a majority of the time (e.g., cycles of the core) in. Accordingly, a thread for which the majority of cycles are spent in the frontend stage is "frontend bound" while a thread for which the majority of cycles are spent in the backend stage is "backend bound" and so on. As discussed above, the managed node 1260 may include resources distributed across multiple sleds and in such embodiments, the CPU 1302 may include portions thereof located on the same sled or different sled.

The main memory 1304 may be embodied as any type of volatile (e.g., dynamic random access memory (DRAM), etc.) or non-volatile memory or data storage capable of performing the functions described herein. In some embodiments, all or a portion of the main memory 1304 may be integrated into the CPU 1302. In operation, the main memory 1304 may store various software and data used during operation such as telemetry data, fingerprint data, priority data, pipeline utilization map data, operating systems, applications, programs, libraries, and drivers. As discussed above, the managed node 1260 may include resources distributed across multiple sleds and in such embodiments, the main memory 1304 may include portions thereof located on the same sled or different sled.

The I/O subsystem 1306 may be embodied as circuitry and/or components to facilitate input/output operations with the CPU 1302, the main memory 1304, and other components of the managed node 1260. For example, the I/O subsystem 1306 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1306 may form a portion of a system-on-a-chip (SoC) and be incorporated, along with one or more of the CPU 1302, the main memory 1304, and other components of the managed node 1260, on a single integrated circuit chip.

The communication circuitry 1308 may be embodied as any communication circuit, device, or collection thereof, capable of enabling communications over the network 1230 between the managed node 1260 and another compute device (e.g., the orchestrator server 1240 and/or other managed nodes 1260). The communication circuitry 1308 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1308 includes a network interface controller (NIC) 1310, which may also be referred to as a host fabric interface (HFI). The NIC 1310 may be embodied as one or more add-in-boards, daughter-cards, network interface cards, controller chips, chipsets, or other devices that may be used by the managed node 1260 to connect with another compute device (e.g., the orchestrator server 1240 and/or other managed nodes 1260). In some embodiments, the NIC 1310 may be embodied as part of a system-on-a-chip (SoC) that includes one or more processors, or included on a multichip package that also contains one or more processors. In some embodiments, the NIC 1310 may include a local processor (not shown) and/or a local memory (not shown) that are both local to the NIC

1310. In such embodiments, the local processor of the NIC 1310 may be capable of performing one or more of the functions of the CPU 1302 described herein. Additionally or alternatively, in such embodiments, the local memory of the NIC 1310 may be integrated into one or more components of the managed node 1260 at the board level, socket level, chip level, and/or other levels. As discussed above, the managed node 1260 may include resources distributed across multiple sleds and in such embodiments, the communication circuitry 1308 may include portions thereof located on the same sled or different sled.

The one or more illustrative data storage devices 1312, may be embodied as any type of devices configured for short-term or long-term storage of data such as, for example, memory devices and circuits, memory cards, hard disk drives, solid-state drives, or other data storage devices. Each data storage device 1312 may include a system partition that stores data and firmware code for the data storage device 1312. Each data storage device 1312 may also include an operating system partition that stores data files and executables for an operating system.

Additionally, the managed node 1260 may include a display 1314. The display 1314 may be embodied as, or otherwise use, any suitable display technology including, for example, a liquid crystal display (LCD), a light emitting diode (LED) display, a cathode ray tube (CRT) display, a plasma display, and/or other display usable in a compute device. The display 1314 may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors.

Additionally or alternatively, the managed node 1260 may include one or more peripheral devices 1316. Such peripheral devices 1316 may include any type of peripheral device commonly found in a compute device such as speakers, a mouse, a keyboard, and/or other input/output devices, interface devices, and/or other peripheral devices.

The client device 1220 and the orchestrator server 1240 may have components similar to those described in FIG. 13. The description of those components of the managed node 1260 is equally applicable to the description of components of the client device 1220 and the orchestrator server 1240 and is not repeated herein for clarity of the description, with the exception that, in the illustrative embodiment, the client device 1220 and the orchestrator server 1240 may not include the counters 1322. It should be appreciated that any of the client device 1220 and the orchestrator server 1240 may include other components, sub-components, and devices commonly found in a computing device, which are not discussed above in reference to the managed node 1260 and not discussed herein for clarity of the description.

As described above, the client device 1220, the orchestrator server 1240 and the managed nodes 1260 are illustratively in communication via the network 1230, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (Wi-MAX), etc.), digital subscriber line (DSL) networks, cable networks (e.g., coaxial networks, fiber networks, etc.), or any combination thereof.

Figure 14:
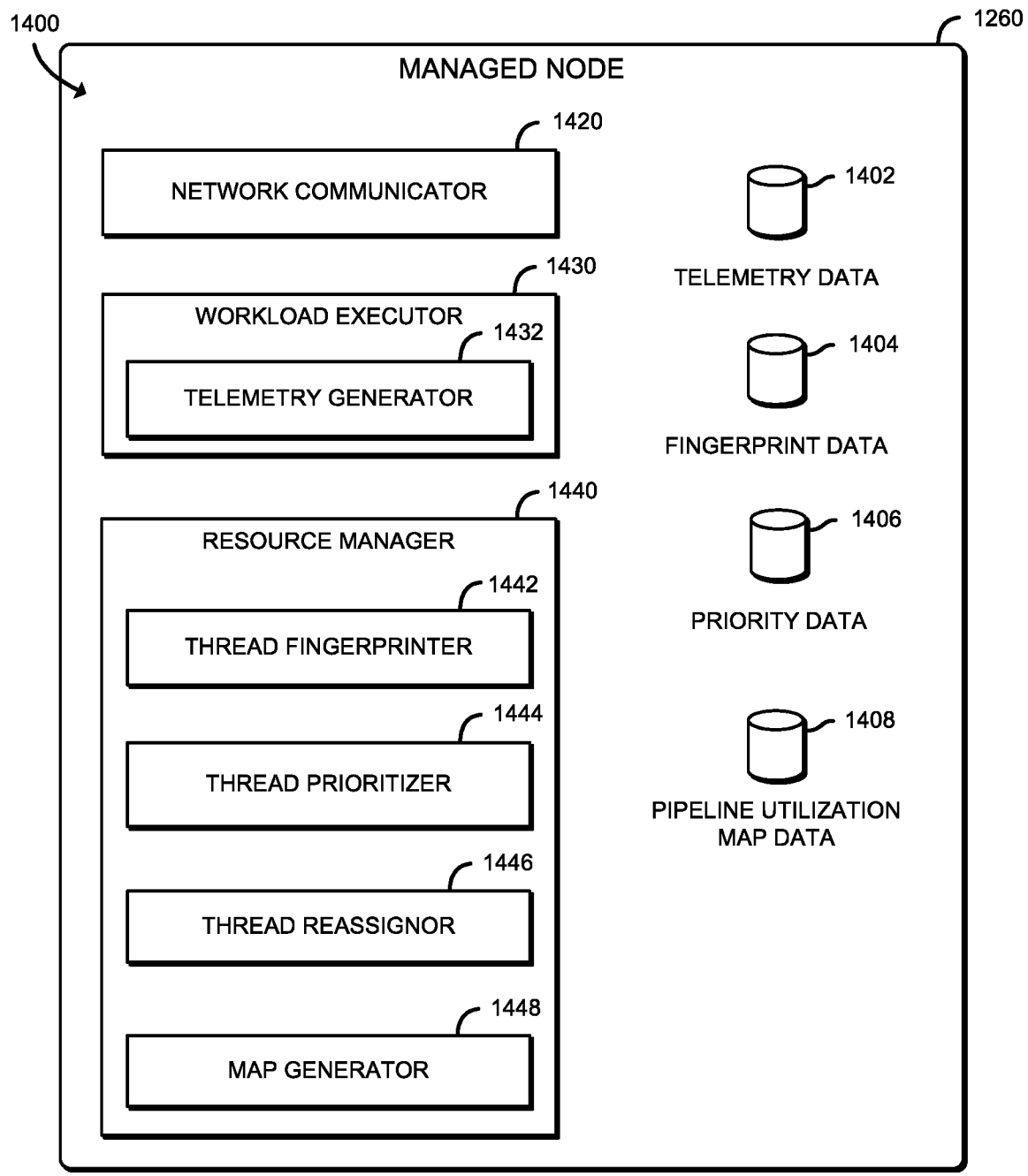
FIG. 14 is a simplified block diagram of at least one embodiment of an environment that may be established by a managed node of FIGS. 12 and 13.

Referring now to FIG. 14, in the illustrative embodiment, each managed node 1260 may establish an environment 1400 during operation. The illustrative environment 1400 includes a network communicator 1420, a workload executor 1430, and a resource manager 1440. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, workload executor circuitry 1430, resource manager circuitry 1440, etc.). It should be appreciated that, in such embodiments, one or more of the network communicator circuitry 1420, workload executor circuitry 1430, or resource manager circuitry 1440 may form a portion of one or more of the CPU 1302, the main memory 1304, the I/O subsystem 1306, and/or other components of the managed node 1260.

In the illustrative embodiment, the environment 1400 includes telemetry data 1402 which may be embodied as data indicative of the performance and conditions of the managed node 1260 as the managed node 1260 executes the workloads assigned to it. In the illustrative embodiment, the telemetry data 1402 includes data from the counters 1322, indicative of the cycles per instruction for each core 1320 and which pipeline stage(s) each thread is utilizing (e.g., instructions from the corresponding thread are in the corresponding pipeline stage) at any given time. Additionally, the illustrative environment 1400 includes fingerprint data 1404 which may be embodied as data indicative of a pattern of usage of the pipeline stages of each thread over a predefined period of time (e.g., one second). Further, in the illustrative embodiment, the environment 1400 includes priority data 1406 which may be embodied as any data indicative of a present priority associated with each thread. In the illustrative embodiment, and as described in more detail herein, threads are scheduled for execution within the cores 1320 as a function of their corresponding priorities, which may be adjusted to reduce core stalling and otherwise improve the efficiency of execution of the workloads. Additionally, in the illustrative embodiment, the environment 1400 includes pipeline utilization map data 1408 which may be embodied as any data indicative of the usage of the pipeline stages by the threads, including the cycles per instruction, the proportion of cycles of each pipeline stage for each thread (e.g., 80% backend stage, 10% frontend stage, 5% bad speculation stage, and 5% retiring stage, etc.), and/or cycles per instruction, of all of the cores 1320 of all of the processors of the CPU 1302 of the managed node 1260.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the managed node 1260, respectively. To do so, the network communicator 1420 is configured to receive and process data packets and to prepare and send data packets to a system or compute device (e.g., the orchestrator server 1240). Accordingly, in some embodiments, at least a portion of the functionality of the network communicator 1420 may be performed by the communication circuitry 1308, and, in the illustrative embodiment, by the NIC 1310.

The workload executor 1430, which may be embodied as hardware, firmware, software, virtualized hardware, emulated architecture, and/or a combination thereof as discussed above, is configured to execute workloads assigned to the managed node 1260 and generate telemetry data in the process, for use by the resource manager 1440. To do so, in the illustrative embodiment, the workload executor 1430 includes a telemetry generator 1432 which, in the illustrative embodiment, is configured to receive data from components of the managed node 1260, including the counters 1322 of the cores 1320, and other components such as the memory 1304, the I/O subsystem 1306, the communication circuitry 1308, and/or the data storage devices 1312, and parse and store the data as the telemetry data 1402 in association with identifiers of the respective components and of the workload threads that the components were performing operations on behalf of when the data was generated. In the illustrative embodiment, the telemetry generator 1432 may actively poll each of the components (e.g., the CPU 1302, the memory 1304, the I/O subsystem 1306, the communication circuitry 1308, the data storage devices 1312, etc.) available within the managed node 1260 for updated telemetry data 1402 on an ongoing basis or may passively receive telemetry data 1402 from the components, such as by monitoring one or more registries, etc.

The resource manager 1440, which may be embodied as hardware, firmware, software, virtualized hardware, emulated architecture, and/or a combination thereof, is configured to analyze the telemetry data 1402 to determine the efficiency of the execution of the workloads in the managed node 1260, provide data indicative of the efficiency to the orchestrator server 1240, determine adjustments to increase the efficiency of the execution of the workloads in the managed node 1260, and apply the adjustments as the workloads are executed. To do so, in the illustrative embodiment, the resource manager 1440 includes a thread fingerprinter 1442, a thread prioritizer 1444, a thread reassignor 1446, and a map generator 1448.

The thread fingerprinter 1442, in the illustrative embodiment, is configured to analyze the usage of each stage of a core pipeline by each thread over a predefined period of time (e.g., one second) to identify a pattern, and store the pattern as a fingerprint in the fingerprint data 1404. The pattern may indicate that a thread may spend a period of time in one stage, typically followed by a period of time in another stage, and then typically spend a subsequent period of time in another of the pipeline stages on a repeating basis (e.g., every second). As such, the fingerprint data 1404 may be used to categorize a thread as primarily utilizing a particular stage and being bound by that stage (e.g., frontend bound, backend bound, etc) and may be used to predict the future pipeline stage utilization of the thread based on the present pipeline stage utilization of the thread.

The thread prioritizer 1444, in the illustrative embodiment, is configured to initially assign a priority (e.g., a default priority) to each thread and adjust the priority to increase the efficiency of execution of the thread, using the telemetry data 1402 and the fingerprint data 1404. In the illustrative embodiment, for every processor in the CPU 1302, the managed node 1260 maintains a run queue of threads that have associated priorities and the threads are given precedence for cycles of the processor cores 1320 as a function of their priorities. The thread prioritizer 1444, in the illustrative embodiment, is configured to map priorities to the threads such that frontend bound threads are given a high priority (e.g., a number in the range of 0-75), retiring threads (e.g., threads in the retiring stage) are also given the high priority (e.g., in the range of 0-75), bad speculation stage threads are given a lower priority (e.g., in the range of 76-110), and backend stage threads are given the lowest priority (e.g., in the range of 111-140), as those threads are typically waiting for data to be accessed from the memory or for a complex calculation to complete.

The thread reassignor 1446, in the illustrative embodiment, is configured to reassign threads to other cores 1320 in the same processor or in another processor of the CPU 1302 of the managed node 1260 to match complementary threads (e.g., a frontend bound thread with a backend bound thread), and otherwise increase the efficiency of execution of the workloads (e.g., decrease the cycles per instruction). The map generator 1448, in the illustrative embodiment, is configured to generate the pipeline utilization map data 1408 from the telemetry data 1402 and fingerprint data 1404. In the illustrative embodiment, components of the resource manager 1440, such as the thread prioritizer 1444 and the thread reassignor 1446, may analyze the pipeline utilization map data 1408 generated by the map generator 1448 to identify, on a per-core basis, the utilizations of the pipeline stages by the threads assigned to the corresponding cores 1320 to identify adjustments to the priorities of the threads and potential reassignments of threads to other cores 1320 in the managed node 1260.

It should be appreciated that each of the thread fingerprinter 1442, the thread prioritizer 1444, the thread reassignor 1446, and the map generator 1448 may be separately embodied as hardware, firmware, software, virtualized hardware, emulated architecture, and/or a combination thereof. For example, the thread fingerprinter 1442 may be embodied as a hardware component, while the thread prioritizer 1444, the thread reassignor 1446, and the map generator 1448 is embodied as virtualized hardware components or as some other combination of hardware, firmware, software, virtualized hardware, emulated architecture, and/or a combination thereof.

Figure 15:
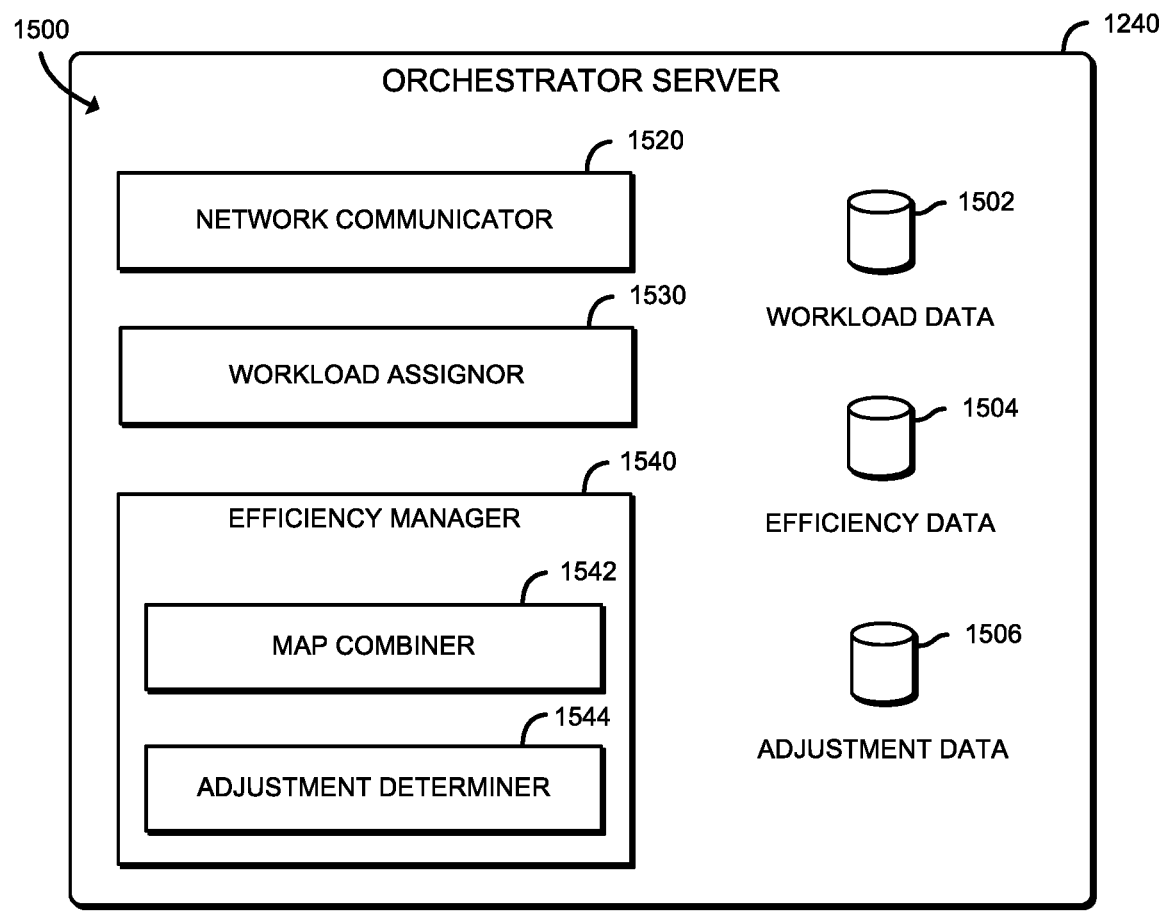
FIG. 15 is a simplified block diagram of at least one embodiment of an environment that may be established by an orchestrator server of FIG. 12.

Referring now to FIG. 15, in the illustrative embodiment, the orchestrator server 1240 may establish an environment 1500 during operation. The illustrative environment 1500 includes a network communicator 1520, a workload assignor 1530, and an efficiency manager 1540. Each of the components of the environment 1500 may be embodied as hardware, firmware, software, or a combination thereof. As such, in some embodiments, one or more of the components of the environment 1500 may be embodied as circuitry or a collection of electrical devices (e.g., network communicator circuitry 1520, workload assignor circuitry 1530, efficiency manager circuitry 1540, etc.). It should be appreciated that, in such embodiments, one or more of the network communicator circuitry 1520, workload assignor circuitry 1530, or efficiency manager circuitry 1540 may form a portion of one or more of the CPU 1302, the main memory 1304, the I/O subsystem 1306, and/or other components of the orchestrator server 1240. In the illustrative embodiment, the environment 1500 includes workload data 1502 which may be embodied as data indicative of the workloads presently executed by the managed nodes 1260 and workloads that have not yet been assigned to the managed nodes 1260. Additionally, in the illustrative embodiment, the environment 1500 includes efficiency data 1504 which may be embodied as data indicative of the efficiency of the execution of the workloads among the cores 1320 of the processors of the managed nodes 1260, such as the fingerprint data 1404, and the pipeline utilization map data 1408, which may be provided by the corresponding managed nodes 1260 to the orchestrator server 1240. In addition, the environment 1500 includes adjustment data 1506 which may be embodied as adjustments to be made to the configuration of the threads of the workloads across the cores 1320 of the managed nodes 1260 to increase the efficiency of workload execution, including adjustments to priorities of the threads and/or reassignments of threads to other cores 1320.

In the illustrative environment 1500, the network communicator 1520, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the orchestrator server 1240, respectively. To do so, the network communicator 1520 is configured to receive and process data packets and to prepare and send data packets to a system or compute device (e.g., the client device 1220, one or more managed nodes 1260, etc.). Accordingly, in some embodiments, at least a portion of the functionality of the network communicator 1520 may be performed by the communication circuitry 1308, and, in the illustrative embodiment, by the NIC 1310.

In the illustrative embodiment, the workload assignor 1530, which may be embodied as hardware, firmware, software, virtualized hardware, emulated architecture, and/or a combination thereof as discussed above, is configured to assign workloads to the managed nodes 1260. In doing so, the workload assignor 1530 may specify, to the assignee managed node 1260, the particular core 1320 within the CPU 1302 that is to execute one or more threads of a workload and/or priorities to be assigned to the threads, based on information from the efficiency manager 1540 described in more detail herein. In the illustrative embodiment, the workload assignor 1530 may additionally reassign workloads across cores within the same managed node 1260 or even from one managed node 1260 to another managed node 1260, based on adjustments determined by the efficiency manager 1540, described in more detail below.

The efficiency manager 1540, in the illustrative embodiment, which may be embodied as hardware, firmware, software, virtualized hardware, emulated architecture, and/or a combination thereof as discussed above, is configured to analyze the efficiency data 1504 across the entire set of managed nodes 1260 and determine adjustments to increase the efficiency of the execution of the workloads. To do so, in the illustrative embodiment, the efficiency manager 1540 includes a map combiner 1542 and an adjustment determiner 1544. The map combiner 1542, in the illustrative embodiment, is configured to combine the pipeline utilization map data 1408 received from each managed node 1260 in the efficiency data 1504 to generate a map of the pipeline utilization of the cores of all of the managed nodes 1260. With a map of the pipeline utilization of the cores 1320 of all of the managed nodes 1260, the efficiency manager 1540 may determine that a core 1320 of one managed node 1260 may be able to more efficiently execute a thread of a workload that is presently assigned to a different managed node 1260 because the core is presently executing a thread that is complementary with (e.g., is bound by a different pipeline stage than) the thread to be reassigned. The adjustment determiner 1544, in the illustrative embodiment, is configured to determine adjustments to the assignments of threads to cores 1320 in the managed nodes 1260 and/or adjustments to the priorities to the threads, similar to the thread prioritizer 1444 and the thread reassignor 1446 of the environment 1400 shown in FIG. 14, except the adjustment determiner 1544 may additionally determine adjustments across the managed nodes 1260 rather than strictly within a single managed node 1260.

It should be appreciated that each of the map combiner 1542 and the adjustment determiner 1544 may be separately embodied as hardware, firmware, software, virtualized hardware, emulated architecture, and/or a combination thereof. For example, the map combiner 1542 may be embodied as a hardware component, while the adjustment determiner 1544 is embodied as virtualized hardware components or as some other combination of hardware, firmware, software, virtualized hardware, emulated architecture, and/or a combination thereof.

Figure 16:
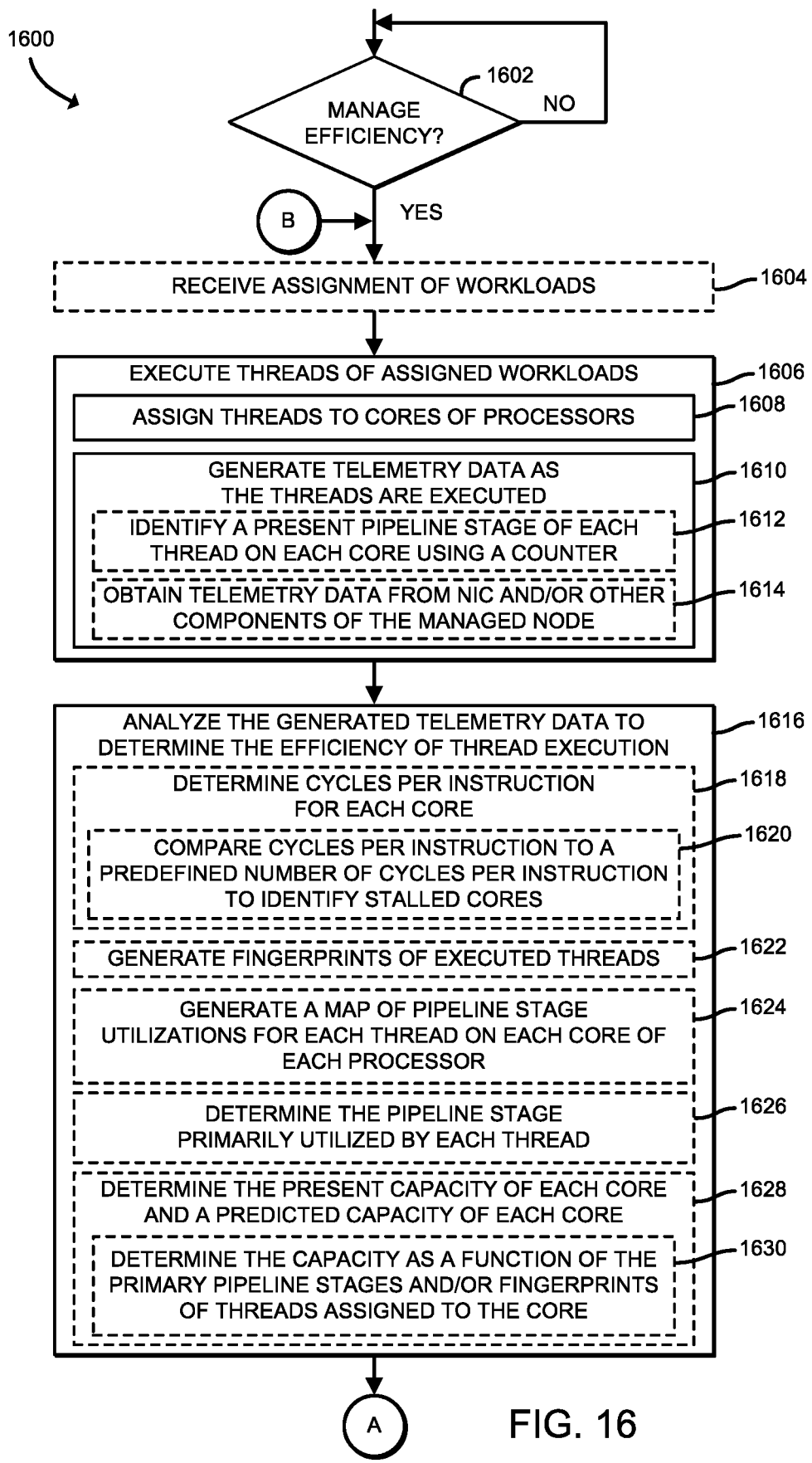
FIGS. 16-17 are a simplified flow diagram of at least one embodiment of a method for managing the efficiency of workload execution that may be performed by a managed node of FIGS. 12-14.

Referring now to FIG. 16, in use, each managed node 1260 may execute a method 1600 for managing the efficiency of the execution of the workloads within the managed node 1260, as the workloads are executed. The method 1600 begins with block 1602, in which the managed node 1260, in the illustrative embodiment, determines whether to manage the efficiency of the execution of workloads. In the illustrative embodiment, the managed node 1260 determines to manage the efficiency of execution if the managed node 1260 is powered on and in communication with the orchestrator server 1240. In other embodiments, the managed node 1260 may determine whether to manage efficiency based on other factors. Regardless, in response to a determination to manage efficiency, in the illustrative embodiment, the method 1600 advances to block 1604 in which the managed node 1260 receives an assignment of one or more workloads. In the illustrative embodiment, in receiving the assignment, the managed node 1260 receives identifications (e.g., executable names, locations of the executables, etc.) of the workloads assigned by the orchestrator server 1240. In doing so, the managed node 1260 may additionally receive an identification of one or more cores 1320 on which to execute threads of the assigned workloads and/or priorities to be assigned to threads of the workloads.

In block 1606, the managed node 1260 executes the threads of the assigned workloads. In doing so, in the illustrative embodiment, the managed node 1260 assigns the threads to one or more of the cores 1320, as indicated in block 1608. The managed node 1260 may assign the threads to the cores 1320 based on indications included in the initial assignment of the workloads from the orchestrator server 1240, based on random selection, or based on any other method for selecting the cores 1320. In block 1610, the managed node 1260 generates the telemetry data 1402 as the workloads are executed. In doing so, in the illustrative embodiment, the managed node 1260 identifies a present pipeline stage of each thread on each core 1320 using a corresponding counter (e.g., the counters 1322), as indicated in block 1612. As described above, each counter 1322 is configured to generate a signal indicative of the presence of a particular instruction of a particular thread in the pipeline stage associated with the counter 1322. Additionally, the managed node 1260 may obtain telemetry data 1402 from one or more other components in the managed node 1260, such as the communication circuitry 1308 (e.g., the NIC 1310), the memory 1304, the I/O subsystem 1306, and/or the data storage devices 1312 indicative of the performance and conditions of those components, as indicated in block 1614.

In block 1616, the managed node 1260 analyzes the generated telemetry data 1402 to determine the efficiency of the execution of the threads of the workloads. In doing so, in the illustrative embodiment, the managed node 1260 determines the number of cycles per instruction for each core 1320, as indicated in block 1618. In the illustrative embodiment, the managed node 1260 does so by comparing the number of signals (e.g., indicative of executed instructions) received from the counters 1322 for a given core 1320 over a predefined time period, such as a second, and comparing the number of signals to the number of cycles of the core for the predefined time period (e.g., the frequency multiplied by one second). Additionally, in the illustrative embodiment, the managed node 1260 compares the cycles per instruction to a predefined number of cycles per instruction to identify any stalled cores 1320 (e.g., cores 1320 in which the cycles per instruction is greater than the predefined number of cycles), as indicated in block 1620.

Additionally, in the illustrative embodiment, the managed node 1260 generates fingerprints of the executed threads, as indicated in block 1622. In the illustrative embodiment, the managed node 1260 may generate the fingerprints by analyzing the usage of each stage of a core pipeline by each thread over a predefined period of time (e.g., one second) to identify a pattern, and storing the pattern in the fingerprint data 1404. For example, the managed node 1260 may determine that a thread may utilize one stage of the pipeline for a period of time, then utilize another stage during a subsequent period of time, and then typically utilize a third stage of the pipeline during a subsequent period of time, before repeating the pattern. As indicated in block 1624, in the illustrative embodiment, the managed node 1260 also generates a map of the pipeline stage utilizations for each thread on each core 1320 of each processor of the CPU 1302 (e.g., the pipeline utilization map data 1408), as described above with reference to FIG. 14. Further, as indicated in block 1626, the managed node 1260, in the illustrative embodiment, determines the pipeline stage primarily used by each thread of the managed node 1260, such as by determining, from the fingerprints generated in block 1622, the pipeline stage that is utilized the most during the predefined time period (e.g., within a one second time period) of the pattern.

In block 1628, in the illustrative embodiment, the managed node 1260 determines the present capacity of each core 1320 and a predicted capacity of each core 1320. In doing so, as indicated in block 1630, the managed node 1260 may determine the capacity as a function of the identification of the primary pipeline stages utilized by each thread, as described with reference to block 1626 and/or as a function of the fingerprints of the threads assigned to each core 1320. For example, the managed node 1260 may determine that a core 1320 that is presently executing a thread that primarily utilizes or is predicted, from the corresponding fingerprint, to utilize the frontend stage, then the core 1320 has relatively little capacity for another thread that primarily utilizes the frontend stage or is predicted to use the frontend stage. Conversely, the core 1320 may have more capacity for a thread that is complementary with the presently executed thread (e.g., a core that primarily uses the backend stage or is predicted to transition to using the backend stage). Subsequently, the method 1600 advances to block 1632 of FIG. 17, in which, in the illustrative embodiment, the managed node 1260 provides efficiency data (e.g., the efficiency data 1504) indicative of the efficiency of the execution of the workload threads in the managed node 1260 to the orchestrator server 1240.

Figure 17:
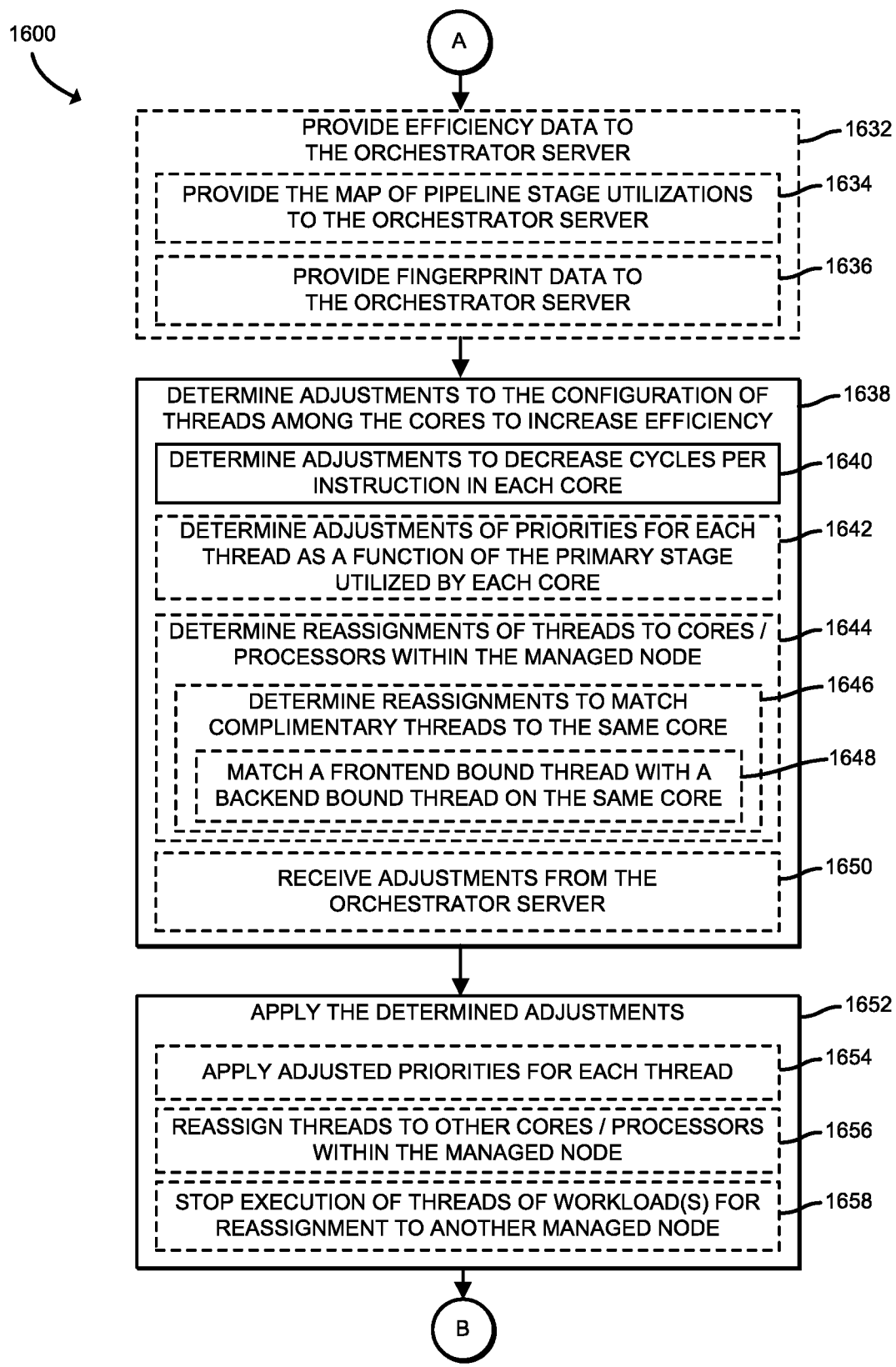

Referring now to FIG. 17, in providing the efficiency data 1504, in the illustrative embodiment, the managed node 1260 provides the map of the pipeline stage utilizations (e.g., the pipeline utilization map data 1408) to the orchestrator server 1240, as indicated in block 1634. Further, in the illustrative embodiment, the managed node 1260 provides the fingerprint data 1404 to the orchestrator server 1240, as indicated in block 1636. Subsequently, the managed node 1260 determines adjustments to the configuration of the threads among the cores 1320 to increase the efficiency of execution, as indicated in block 1638. In doing so, the managed node 1260 determines adjustments to decrease the number of cycles per instruction in each core 1320, as indicated in block 1640. In the illustrative embodiment, the managed node 1260 may determine adjustments of priorities of each thread as a function of the stage primarily utilized by each core, as indicated in block 1642. For example, the managed node 1260 may set the priorities of the threads such that frontend bound threads (e.g., threads primarily in the frontend stage of the pipeline) are given a high priority (e.g., a number in the range of 0-75), retiring threads (e.g., threads primarily in the retiring stage) are also given the high priority (e.g., in the range of 0-75), bad speculation stage threads are given a lower priority (e.g., in the range of 76-110), and backend stage threads are given the lowest priority (e.g., in the range of 111-140), as those threads are typically waiting for data to be accessed from the memory or for a complex calculation to complete.

The managed node 1260 may additionally determine reassignments of one or more of the threads to different cores 1320 of the same processor, or to cores 1320 of different processors in the managed node 1260, as indicated in block 1644. In doing so, the managed node 1260 may determine reassignments to match complementary threads (e.g., threads that primarily utilize different pipeline stages) to the same core 1320, as indicated in block 1646. For example, and as indicated in block 1648, the managed node 1260 may match (e.g., determine to reassign) a frontend bound thread with a backend bound thread for execution on the same core 1320. As indicated in block 1650, the managed node 1260 may additionally or alternatively receive adjustments, such as recommended changes to one or more thread priorities or thread reassignments, from the orchestrator server 1240 (e.g., after the orchestrator server 1240 has analyzed the efficiency data 1504) provided in block 1632.

Subsequently, as indicated in block 1652, the managed node 1260, in the illustrative embodiment, applies the determined adjustments from block 1638. In applying the adjustments, the managed node 1260 may apply the adjusted priorities for each thread, as indicated in block 1654. The managed node 1260 may also reassign threads to other cores 1320 of the same processor or to cores 1320 of other processors, as indicated in block 1656. Additionally or alternatively, the managed node 1260, in the illustrative embodiment, may stop execution of one or more threads of one or more workloads to enable the orchestrator server 1260 to coordinate migrating the workload to another managed node 1260 that has been identified as having cores with capacity to execute the threads of the workload more efficiently, as indicated in block 1658. Subsequently, the method 1600 loops back to block 1604 of FIG. 16, in which the managed node 1260 may receive an assignment of one or more additional workloads from the orchestrator server 1240.

Figure 18:
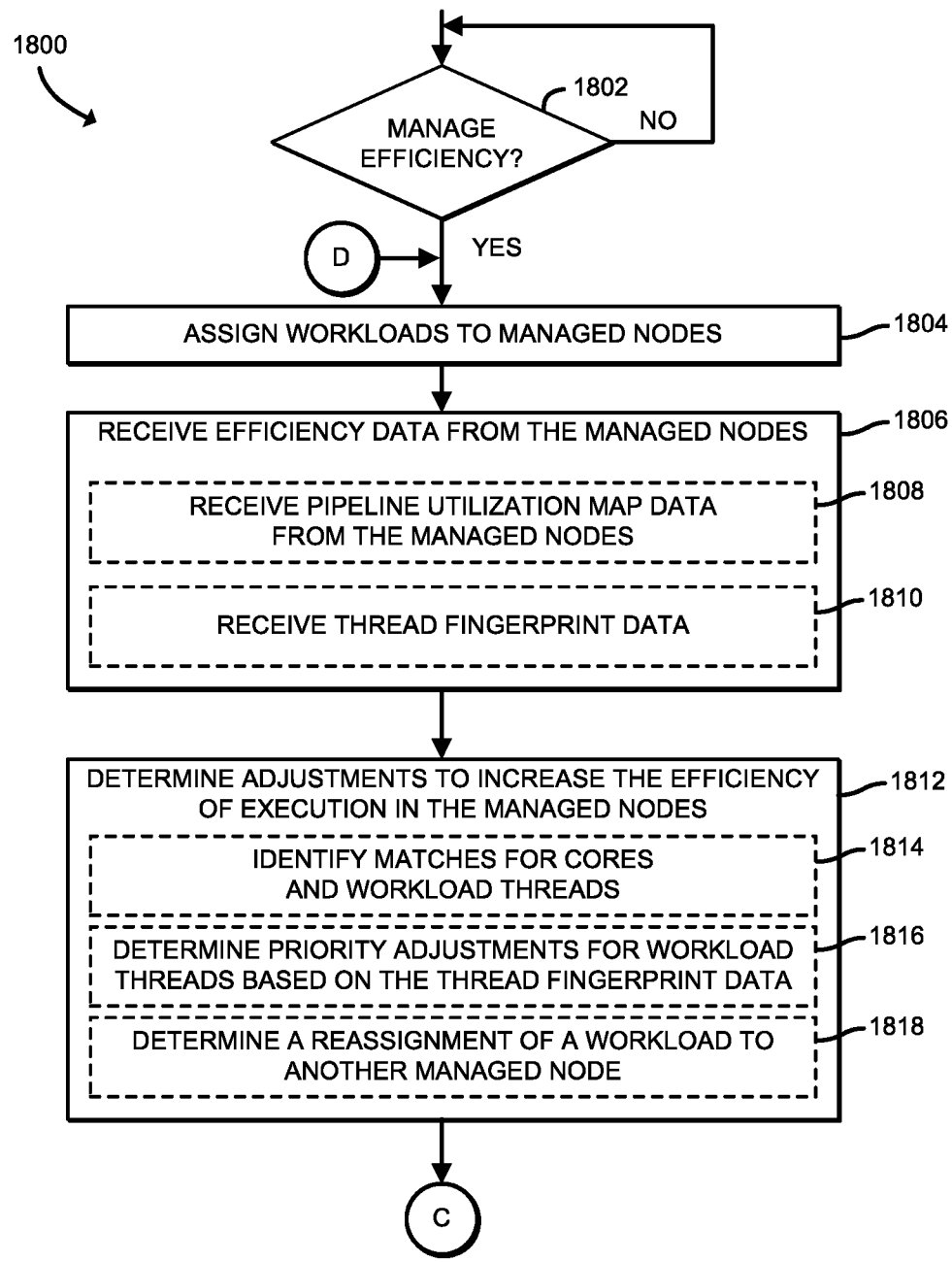
FIGS. 18-19 are a simplified flow diagram of at least one embodiment of a method for managing the efficiency of workload execution among multiple managed nodes that may be performed by an orchestrator server of FIG. 12.

Referring now to FIG. 18, in use, the orchestrator server 1240 may execute a method 1800 for managing the efficiency of execution of the workloads by the managed nodes 1260. The method 1800 begins with block 1802, in which the orchestrator server 1240, in the illustrative embodiment, determines whether to manage the efficiency of execution of the workloads among the managed nodes 1260. In the illustrative embodiment, the orchestrator server 1240 determines to manage the efficiency if the orchestrator server 1240 is powered on and in communication with the managed nodes 1260. In other embodiments, the orchestrator server 1240 may determine whether to manage the efficiency based on other factors. Regardless, in response to a determination to manage the efficiency, the method 1800 advances to block 1804 in which the orchestrator server 1240 assigns workloads to the managed nodes 1260. The orchestrator server 1240 may initially assign the workloads to the managed nodes 1240 based on any suitable scheme (e.g., randomly, based on a predefined sequence, etc.). In block 1806, the orchestrator server 1240 receives the efficiency data 1504 from the managed nodes 1260. In doing so, in the illustrative embodiment, the orchestrator server 1240 receives the pipeline utilization map data 1408 from each managed node 1260, as indicated in block 1808. Additionally, in the illustrative embodiment, the orchestrator server 1240 receives workload thread fingerprint data (e.g., the fingerprint data 1404) from the managed nodes 1260, as indicated in block 1810.

Subsequently, in block 1812, the orchestrator server 1240 determines adjustments to increase the efficiency of execution of the workload threads by the managed nodes 1260. As indicated in block 1814, in doing so, in the illustrative embodiment, the orchestrator server 1240 may identify matches for the cores 1320 of the managed nodes 1260 and the workload threads, such as by identifying the present capacity and/or predicted capacities of the cores 1320 and identifying the threads that would execute more efficiently when matched with the identified capacities of the cores 1320, similar to blocks 1628, 1630, and 1644 of the method 1600 of FIGS. 16-17. As indicated in block 1816, the orchestrator server 1240 may determine priority adjustments for workload threads based on the thread fingerprint data 1404 included in the efficiency data 1504, similar to block 1642 of FIG. 17. Additionally, as indicated in block 1818, the orchestrator server 1240 may determine a reassignment of the threads of a workload to another managed node 1260, such as if a core 1320 on a managed node 1260 is stalled and one or more cores 1320 on another managed node 1260 have the capacity to increase the efficiency of execution of the threads presently assigned to the stalled core 1320. Subsequently, the method 1800 advances to block 1820 of FIG. 19, in which the orchestrator server 1240 provides the determined adjustments to the managed nodes 1260.

Figure 19:
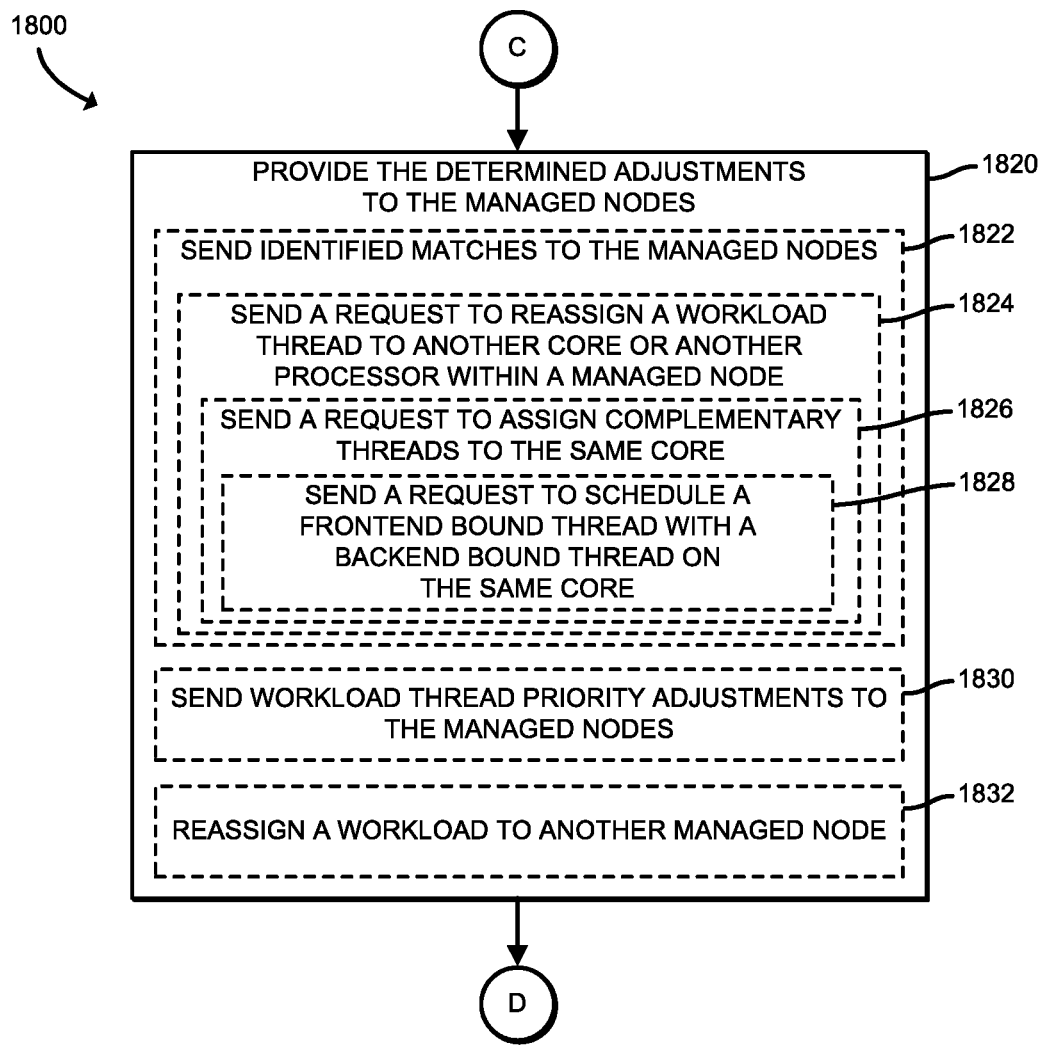

Referring now to FIG. 19, in providing the determine adjustments to the managed nodes 1260, the orchestrator server 1240 may send identified matches of cores with workload threads (e.g., matches identified in block 1814) to one or more of the managed nodes 1260, as indicated by block 1822. In sending the identified matches, the orchestrator server 1240 may send a request to reassign a workload thread to another core 1320 of the same processor or to a core 1320 of a different processor in the same managed node 1260, as indicated in block 1824. As indicated in block 1826, the orchestrator server 1240 may send a request to assign complementary threads to the same core 1320. For example, as indicated in block 1828, the orchestrator server 1240 may send a request to schedule a frontend bound thread to execute with a backend bound thread on the same core 1320. Additionally or alternatively, as indicated in block 1830, in providing the determine adjustments, the orchestrator server 1240 may send workload thread priority readjustments determined in block 1816 of FIG. 18 to one or more of the managed nodes 1260. Additionally or alternatively, as indicated in block 1832, the orchestrator server 1240 may reassign a workload to another managed node 1260, based on a determination to do so in block 1818 of FIG. 18, discussed above. Subsequently, the method 1800 loops back to block 1802 of FIG. 18 in which the orchestrator server 1240 assigns any additional workloads to the managed nodes 1260.

EXAMPLES

Illustrative examples of the technologies disclosed herein are provided below. An embodiment of the technologies may include any one or more, and any combination of, the examples described below.

Example 1 includes a managed node to manage the efficiency of execution of workloads assigned to the managed node, the managed node comprising one or more processors, wherein each processor includes multiple cores; one or more memory devices having stored therein a plurality of instructions that, when executed by the one or more processors, cause the managed node to execute threads of workloads assigned to the managed node; generate telemetry data indicative of an efficiency of execution of the threads, wherein the efficiency is indicative of a number of cycles per instruction executed by a corresponding core; determine, as a function of the telemetry data, an adjustment to a configuration of the threads to increase the efficiency of the execution of the threads; and apply the determined adjustment.

Example 2 includes the subject matter of Example 1, and wherein to generate the telemetry data comprises to utilize a counter associated with each stage of a pipeline of each core to identify a present pipeline stage of each thread.

Example 3 includes the subject matter of any of Examples 1 and 2, and wherein the plurality of instructions, when executed, cause the managed node to analyze the telemetry data to determine the efficiency of execution of the threads.

Example 4 includes the subject matter of any of Examples 1-3, and wherein to determine the efficiency of execution comprises to determine a number of cycles per instruction for each core.

Example 5 includes the subject matter of any of Examples 1-4, and wherein, the plurality of instructions, when executed, cause the managed node to compare the number of cycles per instruction to a predefined number of cycles per instruction to determine whether one or more of the cores is stalled.

Example 6 includes the subject matter of any of Examples 1-5, and wherein to determine the efficiency comprises to generate fingerprints indicative of a pattern of usage, by each thread, of pipeline stages of the corresponding core over a predefined time period.

Example 7 includes the subject matter of any of Examples 1-6, and wherein to determine the efficiency comprises to determine a present capacity of each core and a predicted capacity of each core as a function of the generated fingerprints.

Example 8 includes the subject matter of any of Examples 1-7, and wherein to determine the efficiency comprises to generate a map indicative of pipeline stage utilizations of each thread on each core of the one or more processors.

Example 9 includes the subject matter of any of Examples 1-8, and wherein to determine the efficiency comprises to determine a pipeline stage primarily utilized by each thread.

Example 10 includes the subject matter of any of Examples 1-9, and wherein to determine the efficiency comprises to determine a present capacity of each core and a predicted capacity of each core as a function of the determined pipeline stage primarily utilized by each thread.

Example 11 includes the subject matter of any of Examples 1-10, and wherein the plurality of instructions, when executed, further cause the managed node to provide efficiency data indicative of the determined efficiency to an orchestrator server.

Example 12 includes the subject matter of any of Examples 1-11, and wherein to provide the efficiency data comprises to provide a map indicative of pipeline stage utilizations of each thread on each core of the one or more processors to the orchestrator server.

Example 13 includes the subject matter of any of Examples 1-12, and wherein to provide the efficiency data comprises to provide fingerprints indicative of a pattern of usage, by each thread, of pipeline stages of the corresponding core over a predefined time period to the orchestrator server.

Example 14 includes the subject matter of any of Examples 1-13, and wherein to determine adjustments comprises to determine adjustments to decrease a number of cycles per instruction in one or more of the cores.

Example 15 includes the subject matter of any of Examples 1-14, and wherein to determine adjustments comprises to determine adjustments to priorities of one or more of the threads as a function of an identification of a pipeline stage primarily used by each thread.

Example 16 includes the subject matter of any of Examples 1-15, and wherein to determine adjustments comprises to determine a reassignment of one or more of the threads to another core or another processor of the one or more processors.

Example 17 includes the subject matter of any of Examples 1-16, and wherein to determine the reassignment comprises to determine a reassignment to match complementary threads to one or more of the cores.

Example 18 includes the subject matter of any of Examples 1-17, and wherein to match complementary threads comprises to match a frontend bound thread with a backend bound thread on the same core.

Example 19 includes the subject matter of any of Examples 1-18, and wherein the plurality of instructions, when executed, cause the managed node to receive adjustment data indicative of an adjustment determined by an orchestrator server.

Example 20 includes the subject matter of any of Examples 1-19, and wherein to generate the telemetry data comprises to obtain performance data from communication circuitry of the managed node.

Example 21 includes a method for managing the efficiency of execution of workloads assigned a managed node, the method comprising executing, by the managed node with one or more processors that each include multiple cores, threads of workloads assigned to the managed node; generating, by the managed node, telemetry data indicative of an efficiency of execution of the threads wherein the efficiency is indicative of a number of cycles per instruction executed by a corresponding core; determining, by the managed node and as a function of the telemetry data, an adjustment to a configuration of the threads to increase the efficiency of the execution of the threads; and applying, by the managed node, the determined adjustment.

Example 22 includes the subject matter of Example 21, and wherein generating the telemetry data comprises utilizing a counter associated with each stage of a pipeline of each core to identify a present pipeline stage of each thread.

Example 23 includes the subject matter of any of Examples 21 and 22, and further including analyzing, by the managed node, the telemetry data to determine the efficiency of execution of the threads.

Example 24 includes the subject matter of any of Examples 21-23, and wherein determining the efficiency of execution comprises determining a number of cycles per instruction for each core.

Example 25 includes the subject matter of any of Examples 21-24, and further including comparing, by the managed node, the number of cycles per instruction to a predefined number of cycles per instruction to determine whether one or more of the cores is stalled.

Example 26 includes the subject matter of any of Examples 21-25, and wherein determining the efficiency comprises generating fingerprints indicative of a pattern of usage, by each thread, of pipeline stages of the corresponding core over a predefined time period.

Example 27 includes the subject matter of any of Examples 21-26, and wherein determining the efficiency comprises determining a present capacity of each core and a predicted capacity of each core as a function of the generated fingerprints.

Example 28 includes the subject matter of any of Examples 21-27, and wherein determining the efficiency comprises generating a map indicative of pipeline stage utilizations of each thread on each core of the one or more processors.

Example 29 includes the subject matter of any of Examples 21-28, and wherein determining the efficiency comprises determining a pipeline stage primarily utilized by each thread.

Example 30 includes the subject matter of any of Examples 21-29, and wherein determining the efficiency comprises determining a present capacity of each core and a predicted capacity of each core as a function of the determined pipeline stage primarily utilized by each thread.

Example 31 includes the subject matter of any of Examples 21-30, and further including providing, by the managed node, efficiency data indicative of the determined efficiency to an orchestrator server.

Example 32 includes the subject matter of any of Examples 21-31, and wherein providing the efficiency data comprises providing a map indicative of pipeline stage utilizations of each thread on each core of the one or more processors to the orchestrator server.

Example 33 includes the subject matter of any of Examples 21-32, and wherein providing the efficiency data comprises providing fingerprints indicative of a pattern of usage, by each thread, of pipeline stages of the corresponding core over a predefined time period to the orchestrator server.

Example 34 includes the subject matter of any of Examples 21-33, and wherein determining adjustments comprises determining adjustments to decrease a number of cycles per instruction in one or more of the cores.

Example 35 includes the subject matter of any of Examples 21-34, and wherein determining adjustments comprises determining adjustments to priorities of one or more of the threads as a function of an identification of a pipeline stage primarily used by each thread.

Example 36 includes the subject matter of any of Examples 21-35, and wherein determining adjustments comprises determining a reassignment of one or more of the threads to another core or another processor of the one or more processors.

Example 37 includes the subject matter of any of Examples 21-36, and wherein determining the reassignment comprises determining a reassignment to match complementary threads to one or more of the cores.

Example 38 includes the subject matter of any of Examples 21-37, and wherein matching complementary threads comprises matching a frontend bound thread with a backend bound thread on the same core.

Example 39 includes the subject matter of any of Examples 21-38, and further including receiving adjustment data indicative of an adjustment determined by an orchestrator server.

Example 40 includes the subject matter of any of Examples 21-39, and wherein generating the telemetry data comprises obtaining performance data from communication circuitry of the managed node.

Example 41 includes one or more machine-readable storage media comprising a plurality of instructions stored thereon that, in response to being executed, cause a managed node to perform the method of any of Examples 21-40.

Example 42 includes a managed node to manage the efficiency of execution of workloads assigned to the managed node, the managed node comprising one or more processors; one or more memory devices having stored therein a plurality of instructions that, when executed by the one or more processors, cause the managed node to perform the method of any of Examples 21-40.

Example 43 includes a managed node to manage the efficiency of execution of workloads assigned to the managed node, the managed node comprising means for performing the method of any of Examples 21-40.

Example 44 includes a managed node to manage the efficiency of execution of workloads assigned to the managed node, the managed node comprising workload executor circuitry to execute, with one or more processors that each include multiple cores, threads of workloads assigned to the managed node and generate telemetry data indicative of an efficiency of execution of the threads, wherein the efficiency is indicative of a number of cycles per instruction executed by a corresponding core; and resource manager circuitry to determine, as a function of the telemetry data, an adjustment to a configuration of the threads to increase the efficiency of the execution of the threads and apply the determined adjustment.

Example 45 includes the subject matter of Example 44, and wherein to generate the telemetry data comprises to utilize a counter associated with each stage of a pipeline of each core to identify a present pipeline stage of each thread.

Example 46 includes the subject matter of any of Examples 44 and 45, and wherein the resource manager circuitry is further to analyze the telemetry data to determine the efficiency of execution of the threads.

Example 47 includes the subject matter of any of Examples 44-46, and wherein to determine the efficiency of execution comprises to determine a number of cycles per instruction for each core.

Example 48 includes the subject matter of any of Examples 44-47, and wherein the resource manager circuitry is further to compare the number of cycles per instruction to a predefined number of cycles per instruction to determine whether one or more of the cores is stalled.

Example 49 includes the subject matter of any of Examples 44-48, and wherein to determine the efficiency comprises to generate fingerprints indicative of a pattern of usage, by each thread, of pipeline stages of the corresponding core over a predefined time period.

Example 50 includes the subject matter of any of Examples 44-49, and wherein to determine the efficiency comprises to determine a present capacity of each core and a predicted capacity of each core as a function of the generated fingerprints.

Example 51 includes the subject matter of any of Examples 44-50, and wherein to determine the efficiency comprises to generate a map indicative of pipeline stage utilizations of each thread on each core of the one or more processors.

Example 52 includes the subject matter of any of Examples 44-51, and wherein to determine the efficiency comprises to determine a pipeline stage primarily utilized by each thread.

Example 53 includes the subject matter of any of Examples 44-52, and wherein to determine the efficiency comprises to determine a present capacity of each core and a predicted capacity of each core as a function of the determined pipeline stage primarily utilized by each thread.

Example 54 includes the subject matter of any of Examples 44-53, and wherein the resource manager is further to provide efficiency data indicative of the determined efficiency to an orchestrator server.

Example 55 includes the subject matter of any of Examples 44-54, and wherein to provide the efficiency data comprises to provide a map indicative of pipeline stage utilizations of each thread on each core of the one or more processors to the orchestrator server.

Example 56 includes the subject matter of any of Examples 44-55, and wherein to provide the efficiency data comprises to provide fingerprints indicative of a pattern of usage, by each thread, of pipeline stages of the corresponding core over a predefined time period to the orchestrator server.

Example 57 includes the subject matter of any of Examples 44-56, and wherein to determine adjustments comprises to determine adjustments to decrease a number of cycles per instruction in one or more of the cores.

Example 58 includes the subject matter of any of Examples 44-57, and wherein to determine adjustments comprises to determine adjustments to priorities of one or more of the threads as a function of an identification of a pipeline stage primarily used by each thread.

Example 59 includes the subject matter of any of Examples 44-58, and wherein to determine adjustments comprises to determine a reassignment of one or more of the threads to another core or another processor of the one or more processors.

Example 60 includes the subject matter of any of Examples 44-59, and wherein to determine the reassignment comprises to determine a reassignment to match complementary threads to one or more of the cores.

Example 61 includes the subject matter of any of Examples 44-60, and wherein to match complementary threads comprises to match a frontend bound thread with a backend bound thread on the same core.

Example 62 includes the subject matter of any of Examples 44-61, and further including network communicator circuitry to receive adjustment data indicative of an adjustment determined by an orchestrator server.

Example 63 includes the subject matter of any of Examples 44-62, and wherein to generate the telemetry data comprises to obtain performance data from communication circuitry of the managed node.

Example 64 includes a managed node to manage the efficiency of execution of workloads assigned to the managed node, the managed node comprising circuitry for executing, with one or more processors that each include multiple cores, threads of workloads assigned to the managed node; circuitry for generating telemetry data indicative of an efficiency of execution of the threads wherein the efficiency is indicative of a number of cycles per instruction executed by a corresponding core; means for determining, as a function of the telemetry data, an adjustment to a configuration of the threads to increase the efficiency of the execution of the threads; and means for applying the determined adjustment.

Example 65 includes the subject matter of Example 64, and wherein the circuitry for generating the telemetry data comprises circuitry for utilizing a counter associated with each stage of a pipeline of each core to identify a present pipeline stage of each thread.

Example 66 includes the subject matter of any of Examples 64 and 65, and further including means for analyzing the telemetry data to determine the efficiency of execution of the threads.

Example 67 includes the subject matter of any of Examples 64-66, and wherein the means for determining the efficiency of execution comprises means for determining a number of cycles per instruction for each core.

Example 68 includes the subject matter of any of Examples 64-67, and further including means for comparing the number of cycles per instruction to a predefined number of cycles per instruction to determine whether one or more of the cores is stalled.

Example 69 includes the subject matter of any of Examples 64-68, and wherein the means for determining the efficiency comprises means for generating fingerprints indicative of a pattern of usage, by each thread, of pipeline stages of the corresponding core over a predefined time period.

Example 70 includes the subject matter of any of Examples 64-69, and wherein the means for determining the efficiency comprises means for determining a present capacity of each core and a predicted capacity of each core as a function of the generated fingerprints.

Example 71 includes the subject matter of any of Examples 64-70, and wherein the means for determining the efficiency comprises means for generating a map indicative of pipeline stage utilizations of each thread on each core of the one or more processors.

Example 72 includes the subject matter of any of Examples 64-71, and wherein the means for determining the efficiency comprises determining a pipeline stage primarily utilized by each thread.

Example 73 includes the subject matter of any of Examples 64-72, and wherein the means for determining the efficiency comprises means for determining a present capacity of each core and a predicted capacity of each core as a function of the determined pipeline stage primarily utilized by each thread.

Example 74 includes the subject matter of any of Examples 64-73, and further including means for providing efficiency data indicative of the determined efficiency to an orchestrator server.

Example 75 includes the subject matter of any of Examples 64-74, and wherein the means for providing the efficiency data comprises means for providing a map indicative of pipeline stage utilizations of each thread on each core of the one or more processors to the orchestrator server.

Example 76 includes the subject matter of any of Examples 64-75, and wherein the means for providing the efficiency data comprises means for providing fingerprints indicative of a pattern of usage, by each thread, of pipeline stages of the corresponding core over a predefined time period to the orchestrator server.

Example 77 includes the subject matter of any of Examples 64-76, and wherein the means for determining adjustments comprises means for determining adjustments to decrease a number of cycles per instruction in one or more of the cores.

Example 78 includes the subject matter of any of Examples 64-77, and wherein the means for determining adjustments comprises means for determining adjustments to priorities of one or more of the threads as a function of an identification of a pipeline stage primarily used by each thread.

Example 79 includes the subject matter of any of Examples 64-78, and wherein the means for determining adjustments comprises means for determining a reassignment of one or more of the threads to another core or another processor of the one or more processors.

Example 80 includes the subject matter of any of Examples 64-79, and wherein the means for determining the reassignment comprises means for determining a reassignment to match complementary threads to one or more of the cores.

Example 81 includes the subject matter of any of Examples 64-80, and wherein the means for matching complementary threads comprises means for matching a frontend bound thread with a backend bound thread on the same core.

Example 82 includes the subject matter of any of Examples 64-81, and further including circuitry for receiving adjustment data indicative of an adjustment determined by an orchestrator server.

Example 83 includes the subject matter of any of Examples 64-82, and wherein the circuitry for generating the telemetry data comprises circuitry for obtaining performance data from communication circuitry of the managed node.

Example 84 includes an orchestrator server to manage the efficiency of execution of workloads assigned to a set of managed nodes, the orchestrator server comprising one or more processors; one or more memory devices having stored therein a plurality of instructions that, when executed by the one or more processors, cause the orchestrator server to assign workloads to the set of managed nodes; receive efficiency data from the managed nodes, wherein the efficiency data is indicative of an efficiency of execution of threads of the workloads by cores of processors in the managed nodes and wherein the efficiency is indicative of a number of cycles per instruction executed by a corresponding core; determine an adjustment to a configuration of the threads to increase the efficiency of execution in the managed nodes; and provide the determined adjustment to the managed nodes.

Example 85 includes the subject matter of Example 84, and wherein to receive the efficiency data from the managed nodes comprises to receive at least one of a map indicative of pipeline stage utilizations of each thread on each core of the managed nodes or thread fingerprint data indicative of a pattern of usage, by each thread, of pipeline stages of the corresponding core over a predefined time period.

Example 86 includes the subject matter of any of Examples 84 and 85, and wherein to determine the adjustments comprises to identify matches of workload threads with cores of the managed nodes.

Example 87 includes the subject matter of any of Examples 84-86, and wherein to provide the determined adjustment comprises to send the identified matches to the managed nodes.

Example 88 includes the subject matter of any of Examples 84-87, and wherein to determine the adjustments comprises to determine adjustments to priorities of the threads as a function of thread fingerprint data indicative of a pattern of usage, by each thread, of pipeline stages of the corresponding core over a predefined time period.

Example 89 includes the subject matter of any of Examples 84-88, and wherein to determine the adjustment comprises to determine a reassignment of a workload from one managed node to another managed node.

Example 90 includes the subject matter of any of Examples 84-89, and wherein to provide the determined adjustment comprises to send a request to reassign a thread to another core or another processor within a managed node.

Example 91 includes the subject matter of any of Examples 84-90, and wherein to provide the determined adjustment comprises to send a request to assign complementary threads to the same core.

Example 92 includes the subject matter of any of Examples 84-91, and wherein to provide the determined adjustment comprises to send a request to schedule a frontend bound thread with a backend bound thread on the same core.

Example 93 includes the subject matter of any of Examples 84-92, and wherein to provide the determined adjustment comprises to send a workload thread priority adjustment to at least of the managed nodes.

Example 94 includes the subject matter of any of Examples 84-93, and wherein to provide the determined adjustment comprises to reassign a workload from one managed node to another managed node.

Example 95 includes a method to manage the efficiency of execution of workloads assigned to a set of managed nodes, the method comprising assigning, by an orchestrator server, workloads to the set of managed nodes; receiving, by the orchestrator server, efficiency data from the managed nodes, wherein the efficiency data is indicative of an efficiency of execution of threads of the workloads by cores of processors in the managed nodes and wherein the efficiency is indicative of a number of cycles per instruction executed by a corresponding core; determining, by the orchestrator server, an adjustment to a configuration of the threads to increase the efficiency of execution in the managed nodes; and providing, by the orchestrator server, the determined adjustment to the managed nodes.

Example 96 includes the subject matter of Example 95, and wherein receiving the efficiency data from the managed nodes comprises receiving at least one of a map indicative of pipeline stage utilizations of each thread on each core of the managed nodes or thread fingerprint data indicative of a pattern of usage, by each thread, of pipeline stages of the corresponding core over a predefined time period.

Example 97 includes the subject matter of any of Examples 95 and 96, and wherein determining the adjustments comprises identifying matches of workload threads with cores of the managed nodes.

Example 98 includes the subject matter of any of Examples 95-97, and wherein providing the determined adjustment comprises sending the identified matches to the managed nodes.

Example 99 includes the subject matter of any of Examples 95-98, and wherein determining the adjustments comprises determining adjustments to priorities of the threads as a function of thread fingerprint data indicative of a pattern of usage, by each thread, of pipeline stages of the corresponding core over a predefined time period.

Example 100 includes the subject matter of any of Examples 95-99, and wherein determining the adjustment comprises determining a reassignment of a workload from one managed node to another managed node.

Example 101 includes the subject matter of any of Examples 95-100, and wherein providing the determined adjustment comprises sending a request to reassign a thread to another core or another processor within a managed node.

Example 102 includes the subject matter of any of Examples 95-101, and wherein providing the determined adjustment comprises sending a request to assign complementary threads to the same core.

Example 103 includes the subject matter of any of Examples 95-102, and wherein providing the determined adjustment comprises sending a request to schedule a frontend bound thread with a backend bound thread on the same core.

Example 104 includes the subject matter of any of Examples 95-103, and wherein providing the determined adjustment comprises sending a workload thread priority adjustment to at least of the managed nodes.

Example 105 includes the subject matter of any of Examples 95-104, and wherein providing the determined adjustment comprises reassigning a workload from one managed node to another managed node.

Example 106 includes one or more machine-readable storage media comprising a plurality of instructions stored thereon that, in response to being executed, cause an orchestrator server to perform the method of any of Examples 95-105.

Example 107 includes an orchestrator server to manage the efficiency of execution of workloads assigned to a set of managed nodes, the orchestrator server comprising one or more processors; one or more memory devices having stored therein a plurality of instructions that, when executed by the one or more processors, cause the orchestrator server to perform the method of any of Examples 95-105.

Example 108 includes an orchestrator server to manage the efficiency of execution of workloads assigned to a set of managed nodes, the orchestrator server comprising means for performing the method of any of Examples 95-105.

Example 109 includes an orchestrator server to manage the efficiency of execution of workloads assigned to a set of managed nodes, the orchestrator server comprising workload assignor circuitry to assign workloads to the set of managed nodes; network communicator circuitry to receive efficiency data from the managed nodes, wherein the efficiency data is indicative of an efficiency of execution of threads of the workloads by cores of processors in the managed nodes and wherein the efficiency is indicative of a number of cycles per instruction executed by a corresponding core; and efficiency manager circuitry to determine an adjustment to a configuration of the threads to increase the efficiency of execution in the managed nodes and provide the determined adjustment to the managed nodes.

Example 110 includes the subject matter of Example 109, and wherein to receive the efficiency data from the managed nodes comprises to receive at least one of a map indicative of pipeline stage utilizations of each thread on each core of the managed nodes or thread fingerprint data indicative of a pattern of usage, by each thread, of pipeline stages of the corresponding core over a predefined time period.

Example 111 includes the subject matter of any of Examples 109 and 110, and wherein to determine the adjustments comprises to identify matches of workload threads with cores of the managed nodes.

Example 112 includes the subject matter of any of Examples 109-111, and wherein to provide the determined adjustment comprises to send the identified matches to the managed nodes.

Example 113 includes the subject matter of any of Examples 109-112, and wherein to determine the adjustments comprises to determine adjustments to priorities of the threads as a function of thread fingerprint data indicative of a pattern of usage, by each thread, of pipeline stages of the corresponding core over a predefined time period.

Example 114 includes the subject matter of any of Examples 109-113, and wherein to determine the adjustment comprises to determine a reassignment of a workload from one managed node to another managed node.

Example 115 includes the subject matter of any of Examples 109-114, and wherein to provide the determined adjustment comprises to send a request to reassign a thread to another core or another processor within a managed node.

Example 116 includes the subject matter of any of Examples 109-115, and wherein to provide the determined adjustment comprises to send a request to assign complementary threads to the same core.

Example 117 includes the subject matter of any of Examples 109-116, and wherein to provide the determined adjustment comprises to send a request to schedule a frontend bound thread with a backend bound thread on the same core.

Example 118 includes the subject matter of any of Examples 109-117, and wherein to provide the determined adjustment comprises to send a workload thread priority adjustment to at least of the managed nodes.

Example 119 includes the subject matter of any of Examples 109-118, and wherein to provide the determined adjustment comprises to reassign a workload from one managed node to another managed node.

Example 120 includes an orchestrator server to manage the efficiency of execution of workloads assigned to a set of managed nodes, the orchestrator server comprising means for assigning workloads to the set of managed nodes; circuitry for receiving efficiency data from the managed nodes, wherein the efficiency data is indicative of an efficiency of execution of threads of the workloads by cores of processors in the managed nodes and wherein the efficiency is indicative of a number of cycles per instruction executed by a corresponding core; means for determining an adjustment to a configuration of the threads to increase the efficiency of execution in the managed nodes; and circuitry for providing the determined adjustment to the managed nodes.

Example 121 includes the subject matter of Example 120, and wherein the circuitry for receiving the efficiency data from the managed nodes comprises circuitry for receiving at least one of a map indicative of pipeline stage utilizations of each thread on each core of the managed nodes or thread fingerprint data indicative of a pattern of usage, by each thread, of pipeline stages of the corresponding core over a predefined time period.

Example 122 includes the subject matter of any of Examples 120 and 121, and wherein the means for determining the adjustments comprises means for identifying matches of workload threads with cores of the managed nodes.

Example 123 includes the subject matter of any of Examples 120-122, and wherein the circuitry for providing the determined adjustment comprises circuitry for sending the identified matches to the managed nodes.

Example 124 includes the subject matter of any of Examples 120-123, and wherein the means for determining the adjustments comprises means for determining adjustments to priorities of the threads as a function of thread fingerprint data indicative of a pattern of usage, by each thread, of pipeline stages of the corresponding core over a predefined time period.

Example 125 includes the subject matter of any of Examples 120-124, and wherein the means for determining the adjustment comprises means for determining a reassignment of a workload from one managed node to another managed node.

Example 126 includes the subject matter of any of Examples 120-125, and wherein the circuitry for providing the determined adjustment comprises circuitry for sending a request to reassign a thread to another core or another processor within a managed node.

Example 127 includes the subject matter of any of Examples 120-126, and wherein the circuitry for providing the determined adjustment comprises circuitry for sending a request to assign complementary threads to the same core.

Example 128 includes the subject matter of any of Examples 120-127, and wherein circuitry for providing the determined adjustment comprises circuitry for sending a request to schedule a frontend bound thread with a backend bound thread on the same core.

Example 129 includes the subject matter of any of Examples 120-128, and wherein the circuitry for providing the determined adjustment comprises circuitry for sending a workload thread priority adjustment to at least of the managed nodes.

Example 130 includes the subject matter of any of Examples 120-129, and wherein the circuitry for providing the determined adjustment comprises circuitry for reassigning a workload from one managed node to another managed node.

The invention claimed is:

1. A managed node to manage the efficiency of execution of workloads assigned to the managed node, the managed node comprising:
   one or more processors, wherein each processor includes multiple cores;
   one or more memory devices having stored therein a plurality of instructions that, when executed by the one or more processors, cause the managed node to:
     execute threads of workloads assigned to the managed node;
     generate telemetry data indicative of an efficiency of execution of the threads, wherein the efficiency is indicative of a number of cycles per instruction executed by a corresponding core;
     determine, as a function of the telemetry data, an adjustment to a configuration of the threads to increase the efficiency of the execution of the threads; and
     apply the determined adjustment.

2. The managed node of claim 1, wherein to generate the telemetry data comprises to utilize a counter associated with each stage of a pipeline of each core to identify a present pipeline stage of each thread.

3. The managed node of claim 1, wherein the plurality of instructions, when executed, cause the managed node to analyze the telemetry data to determine the efficiency of execution of the threads.

4. The managed node of claim 3, wherein to determine the efficiency of execution comprises to determine a number of cycles per instruction for each core.

5. The managed node of claim 4, wherein, the plurality of instructions, when executed, cause the managed node to compare the number of cycles per instruction to a predefined number of cycles per instruction to determine whether one or more of the cores is stalled.

6. The managed node of claim 3, wherein to determine the efficiency comprises to generate fingerprints indicative of a pattern of usage, by each thread, of pipeline stages of the corresponding core over a predefined time period.

7. The managed node of claim 6, wherein to determine the efficiency comprises to determine a present capacity of each core and a predicted capacity of each core as a function of the generated fingerprints.

8. The managed node of claim 3, wherein to determine the efficiency comprises to generate a map indicative of pipeline stage utilizations of each thread on each core of the one or more processors.

9. The managed node of claim 3, wherein to determine the efficiency comprises to determine a pipeline stage primarily utilized by each thread.

10. The managed node of claim 9, wherein to determine the efficiency comprises to determine a present capacity of each core and a predicted capacity of each core as a function of the determined pipeline stage primarily utilized by each thread.

11. The managed node of claim 3, wherein the plurality of instructions, when executed, further cause the managed node to provide efficiency data indicative of the determined efficiency to an orchestrator server.

12. The managed node of claim 11, wherein to provide the efficiency data comprises to provide a map indicative of pipeline stage utilizations of each thread on each core of the one or more processors to the orchestrator server.

13. One or more non-transitory machine-readable storage media comprising a plurality of instructions stored thereon that, in response to being executed, cause a managed node to:
    execute, with one or more processors that each include multiple cores, threads of workloads assigned to the managed node;
    generate telemetry data indicative of an efficiency of execution of the threads wherein the efficiency is indicative of a number of cycles per instruction executed by a corresponding core;
    determine, as a function of the telemetry data, an adjustment to a configuration of the threads to increase the efficiency of the execution of the threads; and
    apply the determined adjustment.

14. The one or more non-transitory machine-readable storage media of claim 13, wherein to generate the telemetry data comprises to utilize a counter associated with each stage of a pipeline of each core to identify a present pipeline stage of each thread.

15. The one or more non-transitory machine-readable storage media of claim 13, wherein the plurality of instructions, when executed, cause the managed node to analyze the telemetry data to determine the efficiency of execution of the threads.

16. The one or more non-transitory machine-readable storage media of claim 15, wherein to determine the efficiency of execution comprises to determine a number of cycles per instruction for each core.

17. The one or more non-transitory machine-readable storage media of claim 16, wherein, the plurality of instructions, when executed, cause the managed node to compare the number of cycles per instruction to a predefined number of cycles per instruction to determine whether one or more of the cores is stalled.

18. The one or more non-transitory machine-readable storage media of claim 15, wherein to determine the efficiency comprises to generate fingerprints indicative of a pattern of usage, by each thread, of pipeline stages of the corresponding core over a predefined time period.

19. The one or more non-transitory machine-readable storage media of claim 18, wherein to determine the efficiency comprises to determine a present capacity of each core and a predicted capacity of each core as a function of the generated fingerprints.

20. The one or more non-transitory machine-readable storage media of claim 15, wherein to determine the efficiency comprises to generate a map indicative of pipeline stage utilizations of each thread on each core of the one or more processors.

21. The one or more non-transitory machine-readable storage media of claim 15, wherein to determine the efficiency comprises to determine a pipeline stage primarily utilized by each thread.

22. The one or more non-transitory machine-readable storage media of claim 21, wherein to determine the efficiency comprises to determine a present capacity of each core and a predicted capacity of each core as a function of the determined pipeline stage primarily utilized by each thread.

23. The one or more non-transitory machine-readable storage media of claim 15, wherein the plurality of instructions, when executed, further cause the managed node to provide efficiency data indicative of the determined efficiency to an orchestrator server.

24. The one or more non-transitory machine-readable storage media of claim 23, wherein to provide the efficiency data comprises to provide a map indicative of pipeline stage utilizations of each thread on each core of the one or more processors to the orchestrator server.

25. A managed node to manage the efficiency of execution of workloads assigned to the managed node, the managed node comprising:
    circuitry for executing, with one or more processors that each include multiple cores, threads of workloads assigned to the managed node;
    circuitry for generating telemetry data indicative of an efficiency of execution of the threads wherein the efficiency is indicative of a number of cycles per instruction executed by a corresponding core;
    means for determining, as a function of the telemetry data, an adjustment to a configuration of the threads to increase the efficiency of the execution of the threads; and
    means for applying the determined adjustment.

26. A method for managing the efficiency of execution of workloads assigned a managed node, the method comprising:
    executing, by the managed node with one or more processors that each include multiple cores, threads of workloads assigned to the managed node;
    generating, by the managed node, telemetry data indicative of an efficiency of execution of the threads wherein the efficiency is indicative of a number of cycles per instruction executed by a corresponding core;
    determining, by the managed node and as a function of the telemetry data, an adjustment to a configuration of the threads to increase the efficiency of the execution of the threads; and
    applying, by the managed node, the determined adjustment.

27. The method of claim 26, wherein generating the telemetry data comprises utilizing a counter associated with each stage of a pipeline of each core to identify a present pipeline stage of each thread.

28. The method of claim 26, further comprising analyzing, by the managed node, the telemetry data to determine the efficiency of execution of the threads.

* * * * *